United States Patent [19]

Von Meister

[11] Patent Number: 5,452,099
[45] Date of Patent: Sep. 19, 1995

[54] METHOD AND SYSTEM FOR STORAGE AND/OR TRANSMISSION OF CONFIDENTIAL FACSIMILE DOCUMENTS

[75] Inventor: William Von Meister, Great Falls, Va.

[73] Assignee: Faxguard Systems Corporation, Vienna, Va.

[21] Appl. No.: 45,068

[22] Filed: Apr. 12, 1993

[51] Int. Cl.⁶ .................. H04N 1/32; H04N 1/44; H04N 1/21
[52] U.S. Cl. .................. 358/403; 358/407; 358/434; 358/440; 358/444; 358/468
[58] Field of Search ........... 358/402, 403, 407, 440, 358/468, 434, 435, 436, 438, 439, 444; 379/89, 95, 100

[56] References Cited

U.S. PATENT DOCUMENTS

| | | |
|---|---|---|
| 4,580,012 | 4/1986 | Matthews et al. |
| 4,585,906 | 4/1986 | Matthews et al. |
| 4,602,129 | 7/1986 | Matthews et al. |
| 4,607,289 | 8/1986 | Kurokawa |
| 4,654,718 | 3/1987 | Sueyoshi ............ 379/100 |
| 4,870,678 | 9/1989 | Adachi |
| 4,918,722 | 4/1990 | Duehren et al. |
| 4,935,955 | 6/1990 | Neudorfer |
| 4,960,981 | 10/1990 | Benton et al. |
| 4,994,926 | 2/1991 | Gordon et al. |
| 5,008,926 | 4/1991 | Misholi |
| 5,057,935 | 10/1991 | Williams |
| 5,068,888 | 11/1991 | Scherk et al. |
| 5,166,977 | 11/1992 | Ross |
| 5,170,428 | 12/1992 | Watanabe et al. |
| 5,251,251 | 10/1993 | Barber et al. ............ 379/89 |

FOREIGN PATENT DOCUMENTS 2211698 7/1989 United Kingdom .

OTHER PUBLICATIONS

"Flexible Facsimile Transmission [Faxpak]," *Telecommunications*, pp. 39–42, Mar. 1980.
"ITT Inaugurates Faxpack," *Business Communication Review*, pp. 29–31, Nov.–Dec. 1979.
FaxPak Facsimile Transmission Service Brochure, Interference No. 102, 468, (undated).

*Primary Examiner*—Scott A. Rogers
*Attorney, Agent, or Firm*—Browdy and Neimark

[57] ABSTRACT

Disclosed is a method and system for receiving and transmitting confidential documents and the like via facsimile machines. The system includes a security code-responsive, computer-controlled store and forward facility (SAFF) for receiving and transmitting documents between two remote facsimile machines. A security code is provided by the sender for each document transmission. The number does not identify a subscriber or a mailbox but identifies a fax message. Various degrees of security may be provided in sending a faxed document from a first location to a second location.

50 Claims, 18 Drawing Sheets

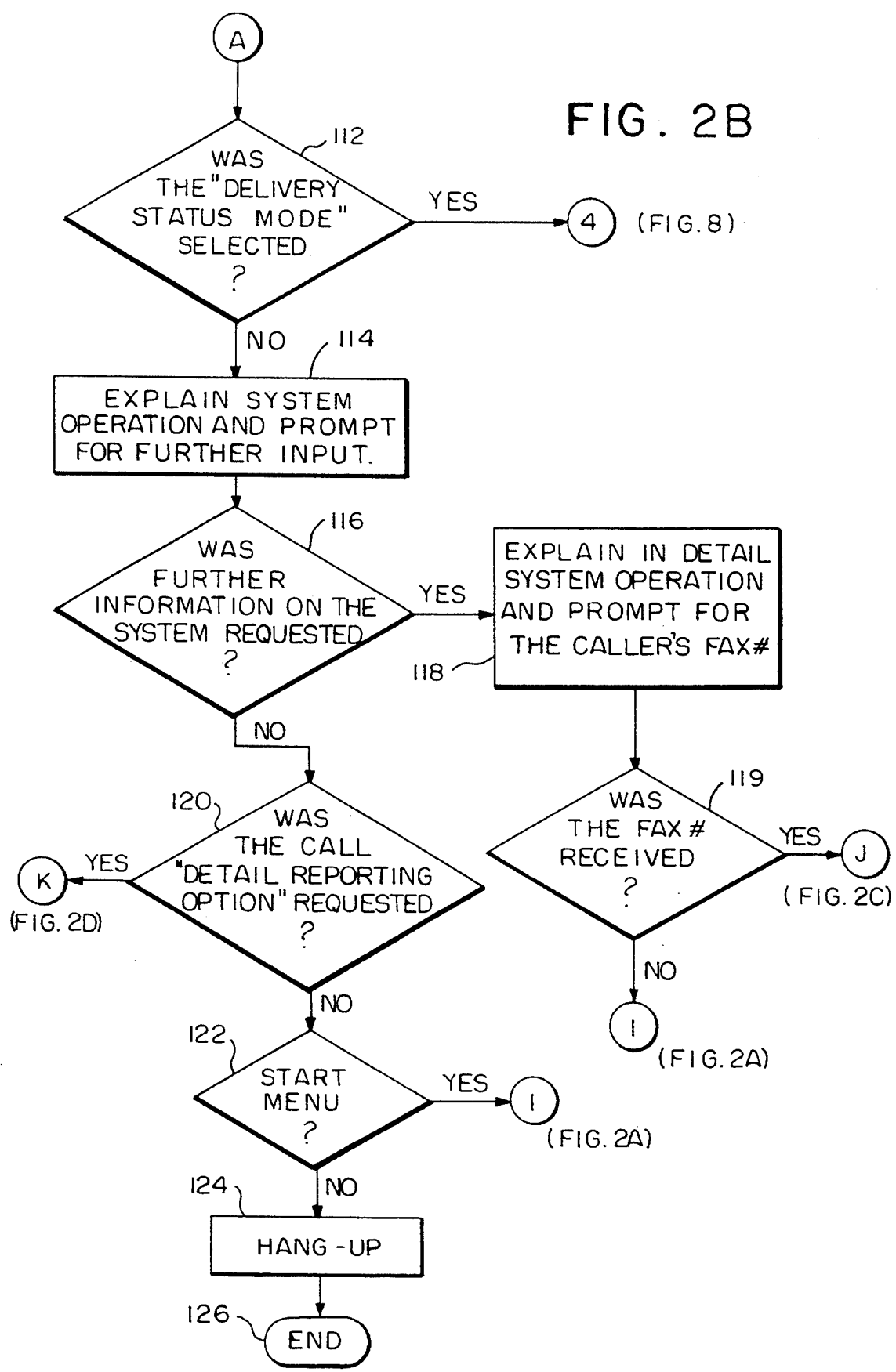

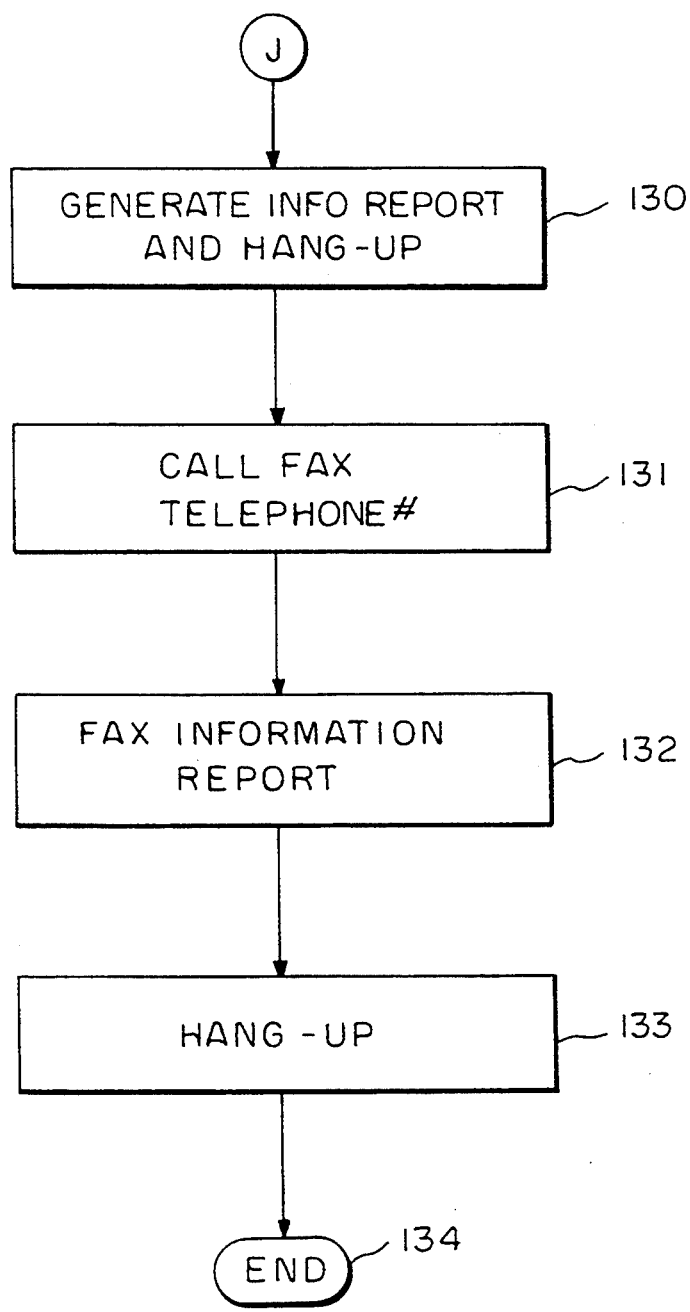

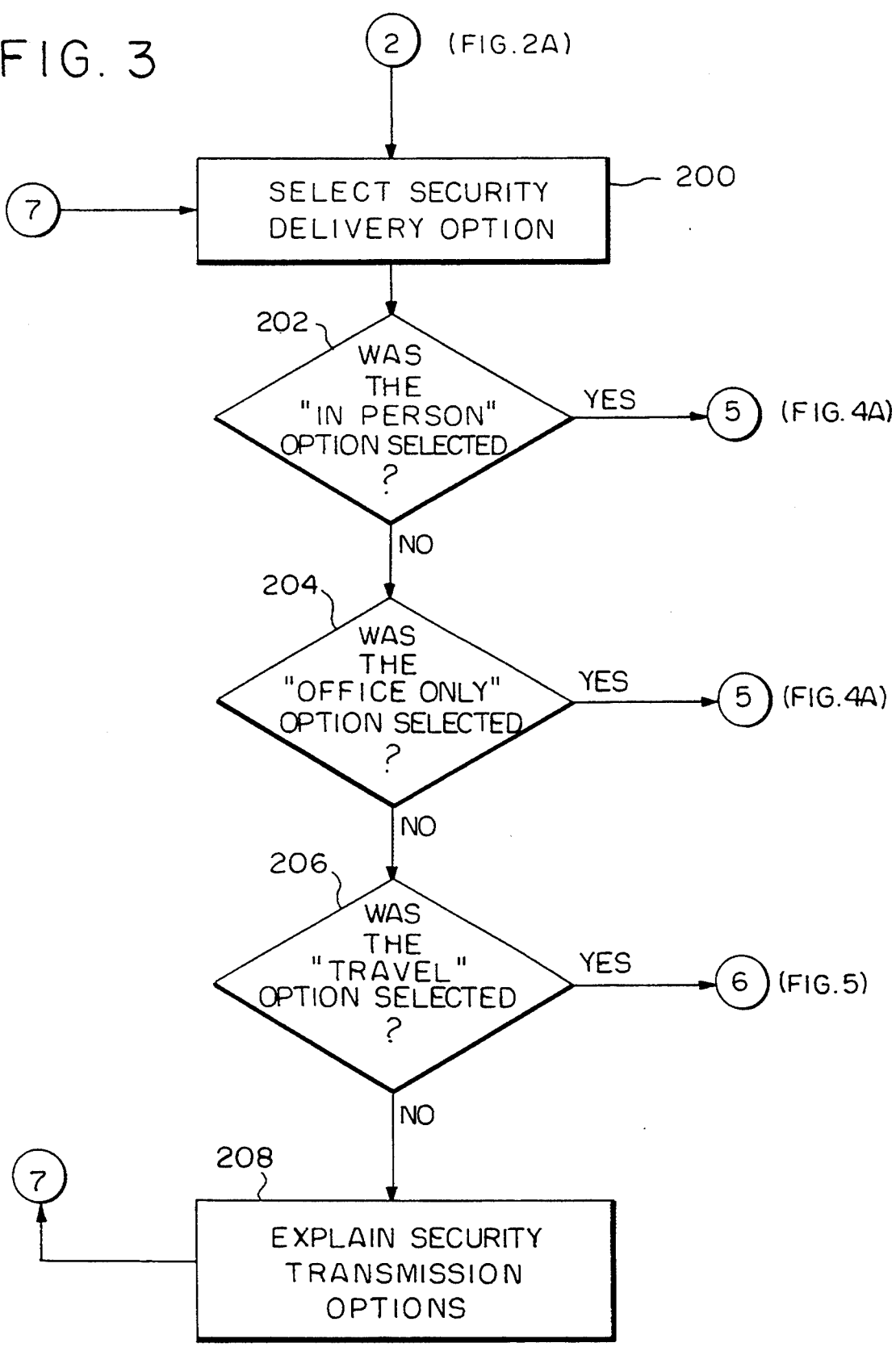

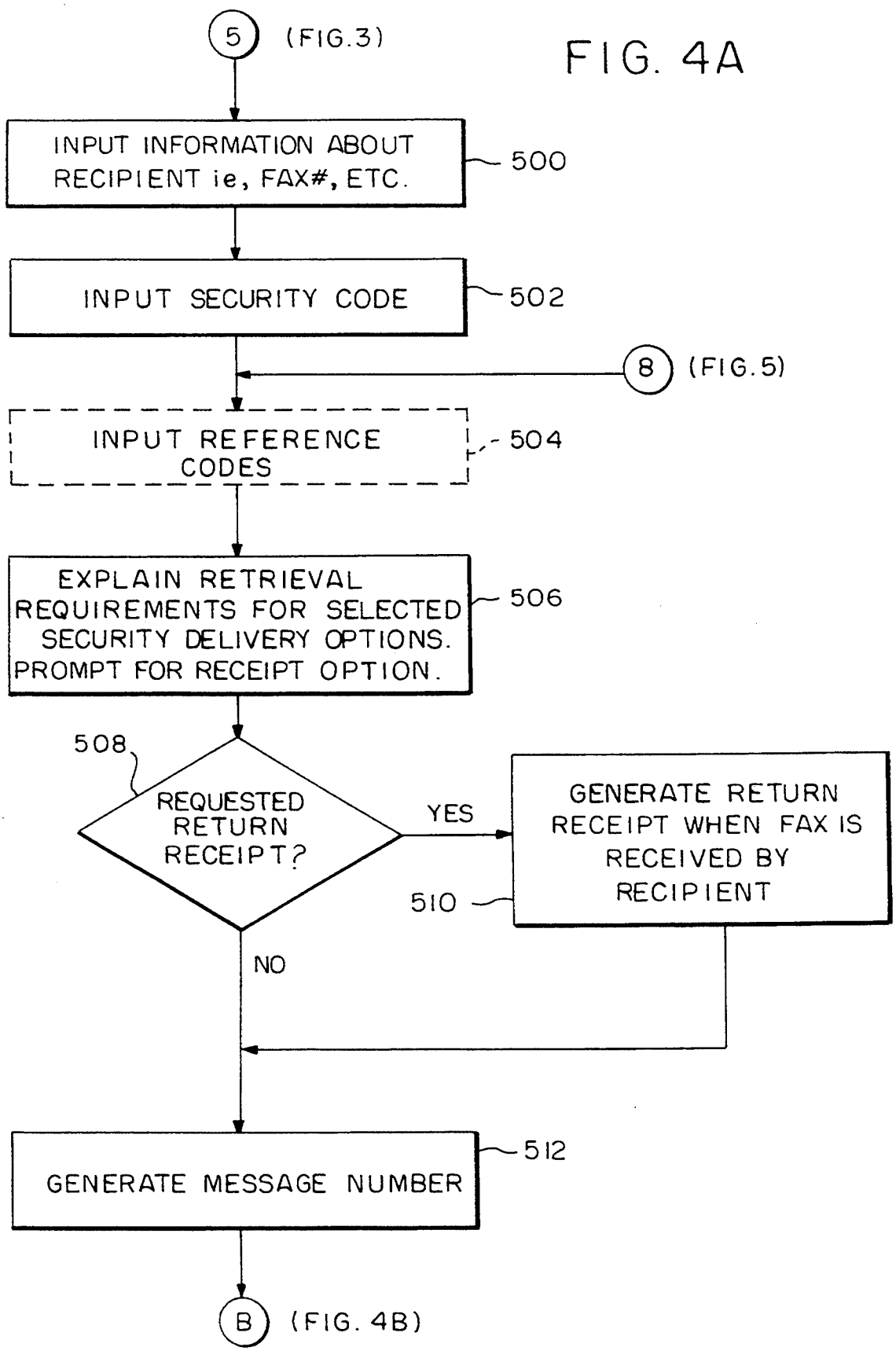

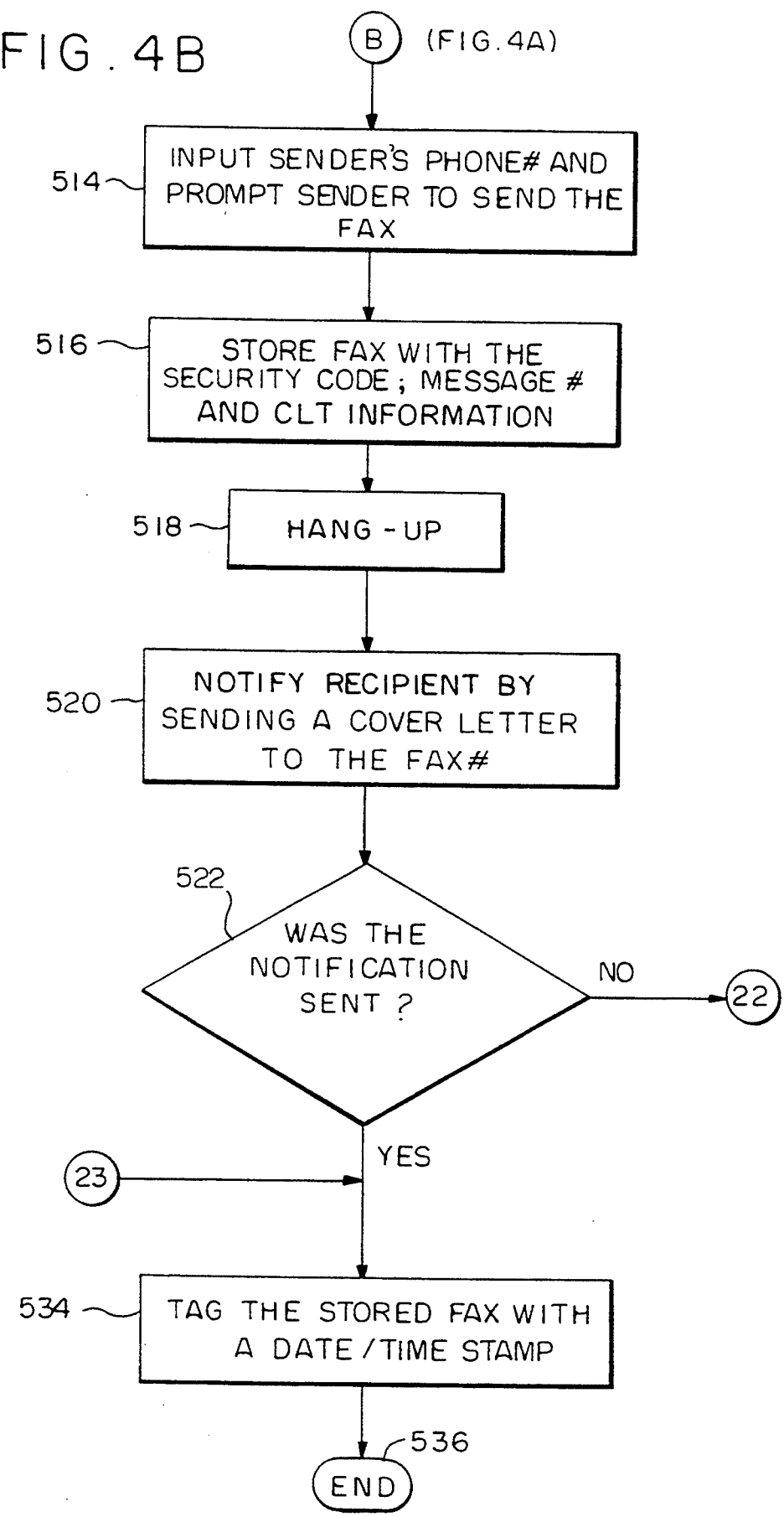

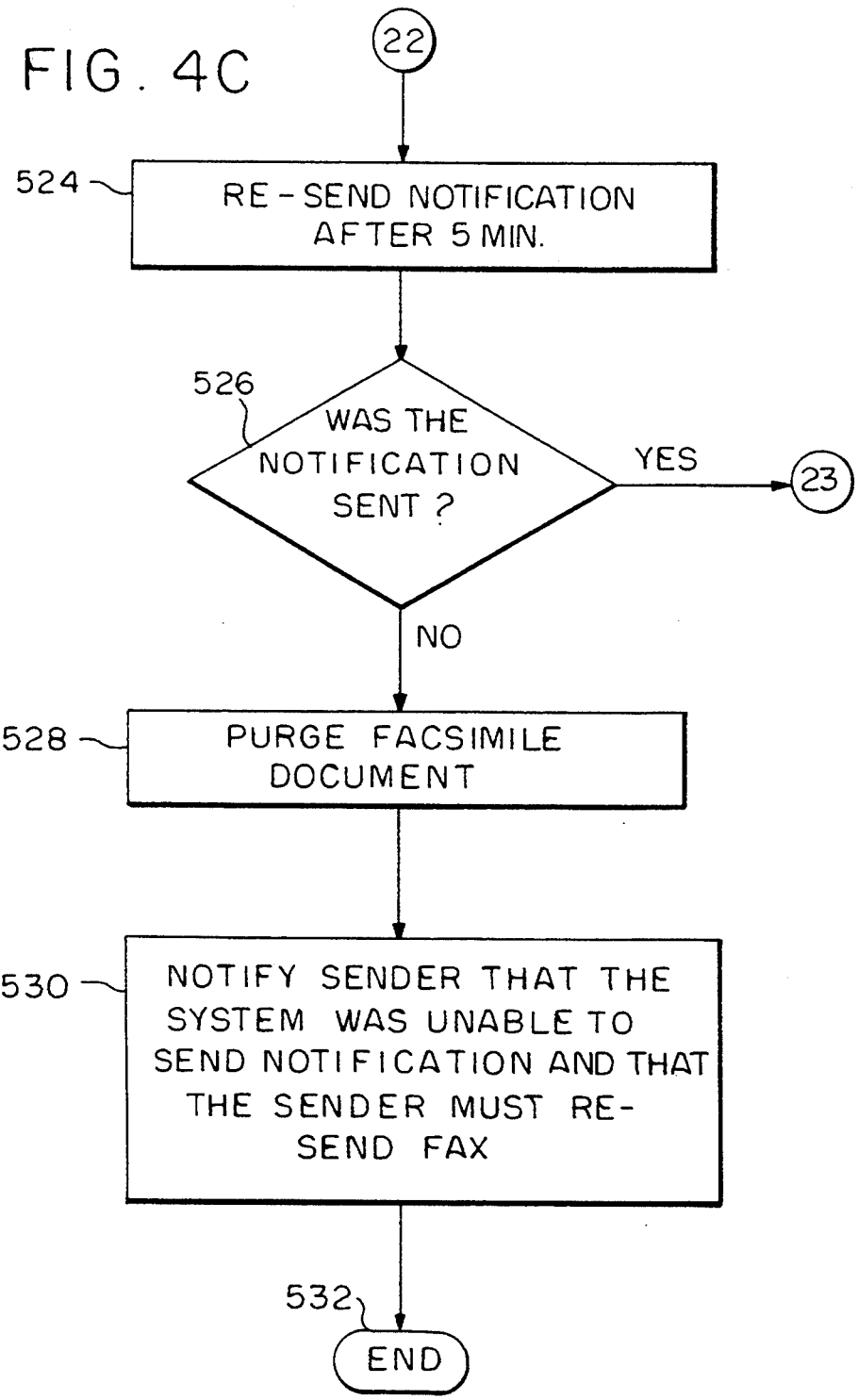

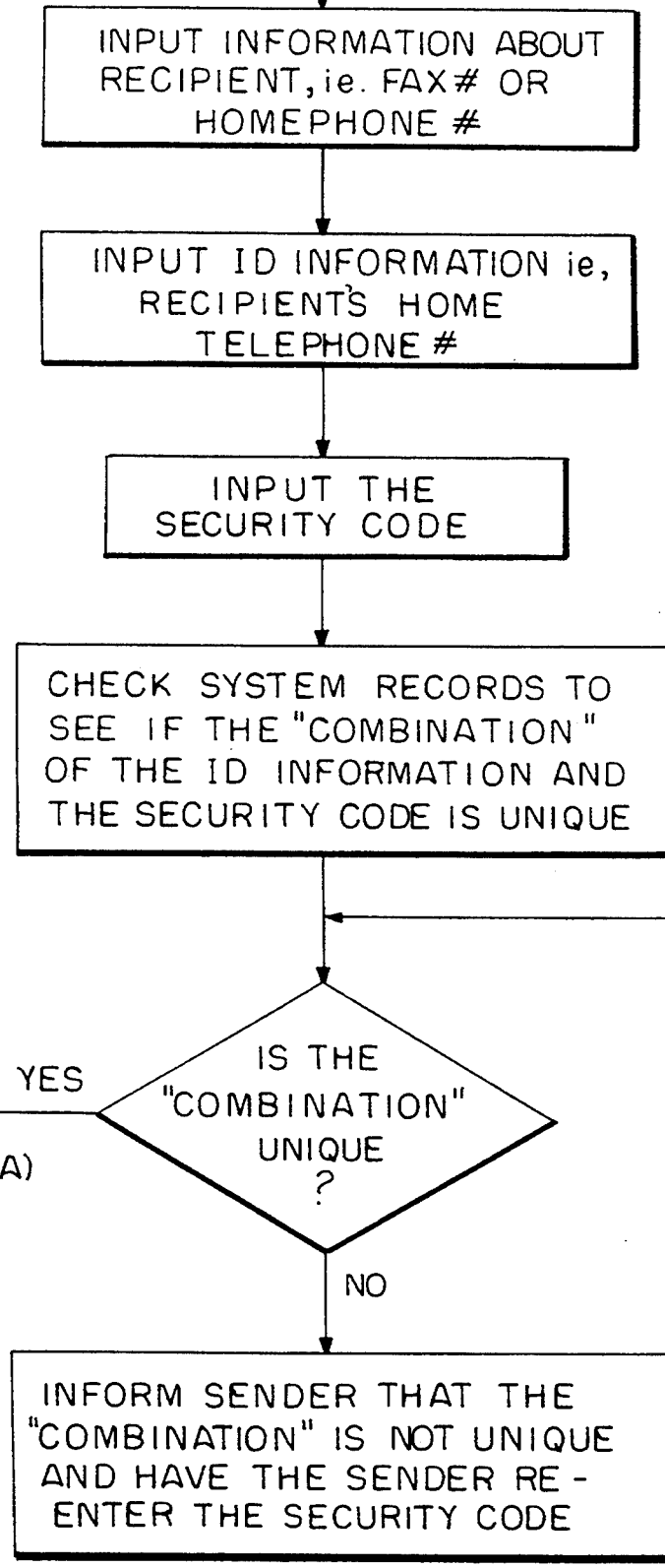

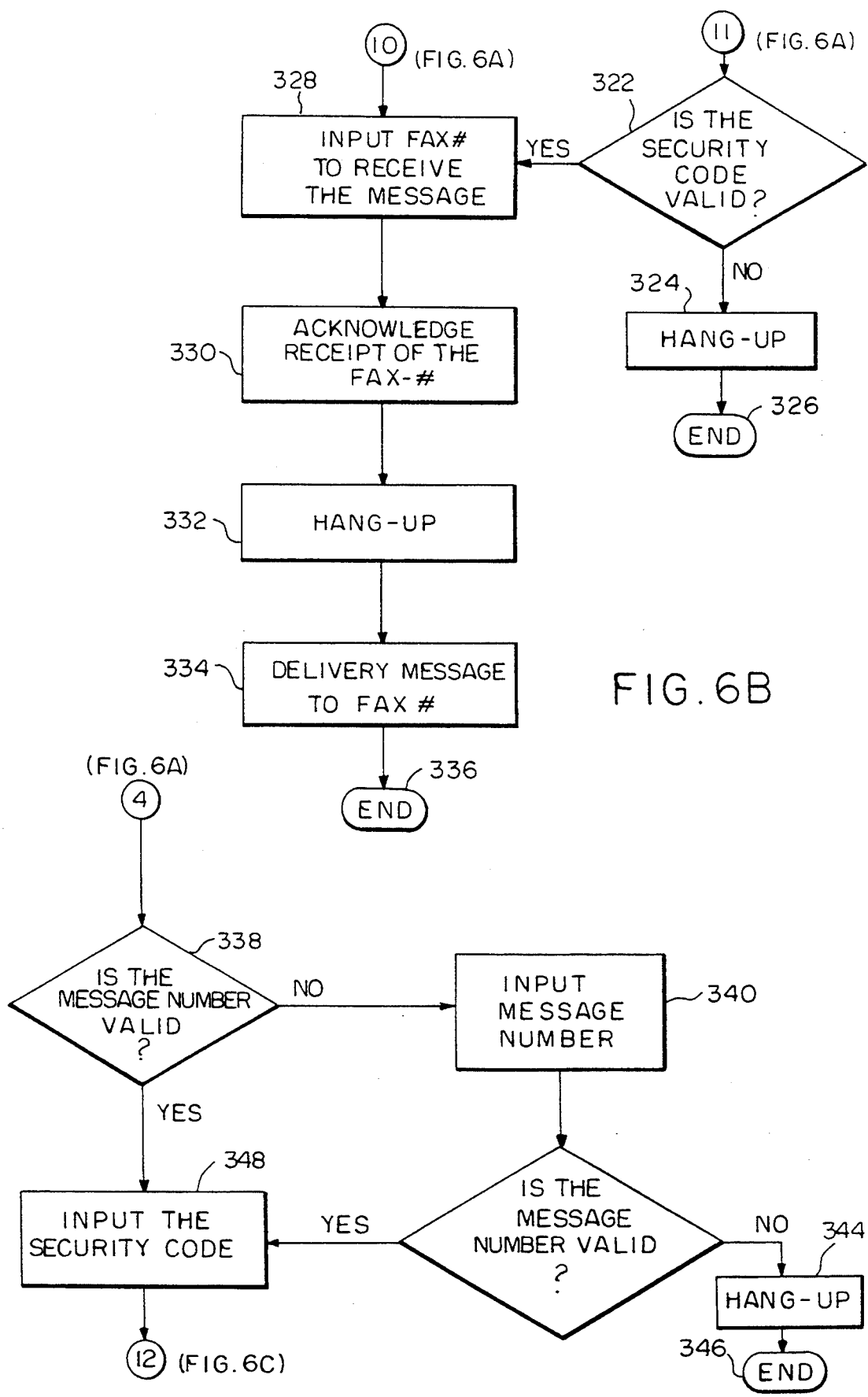

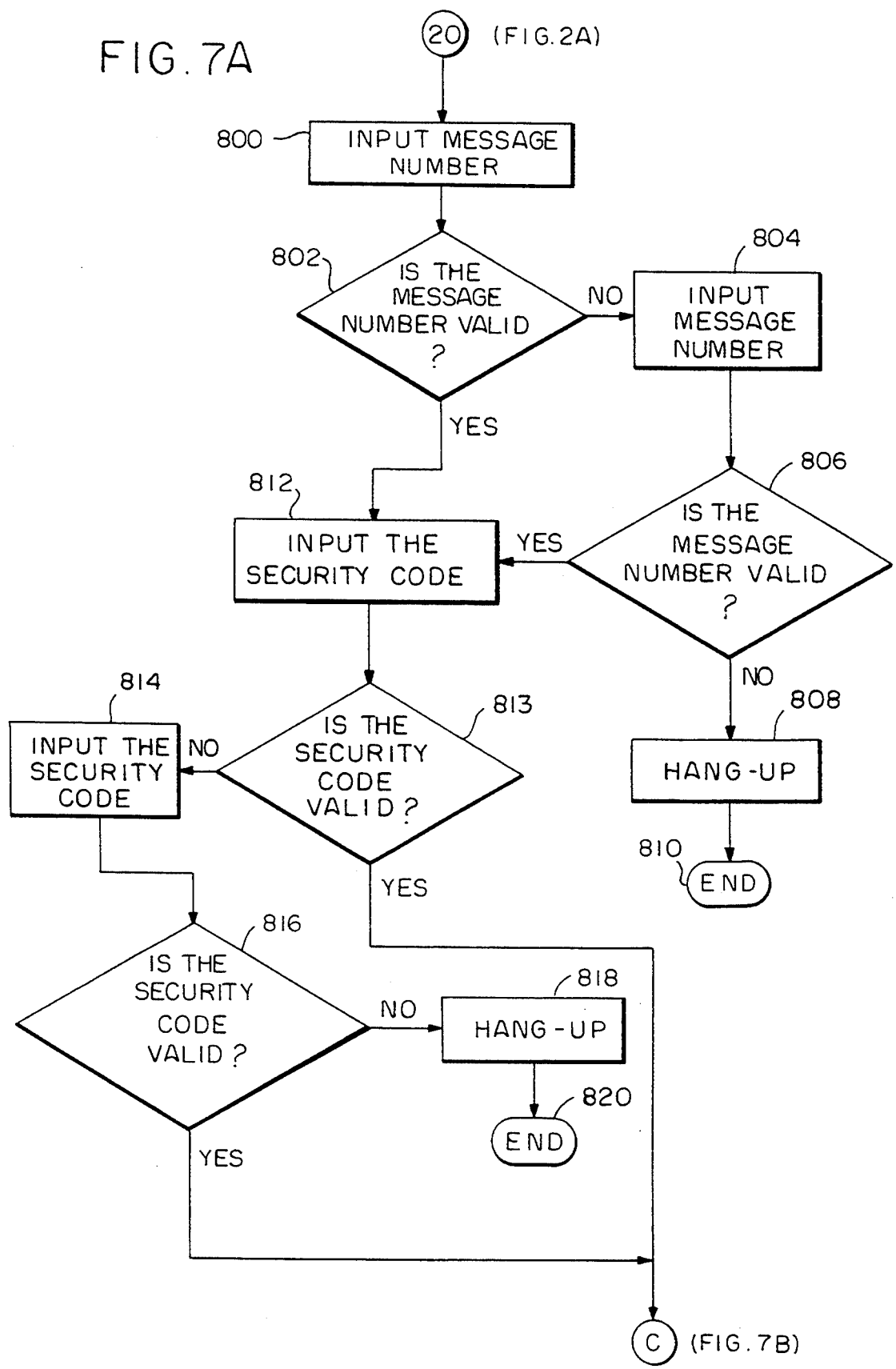

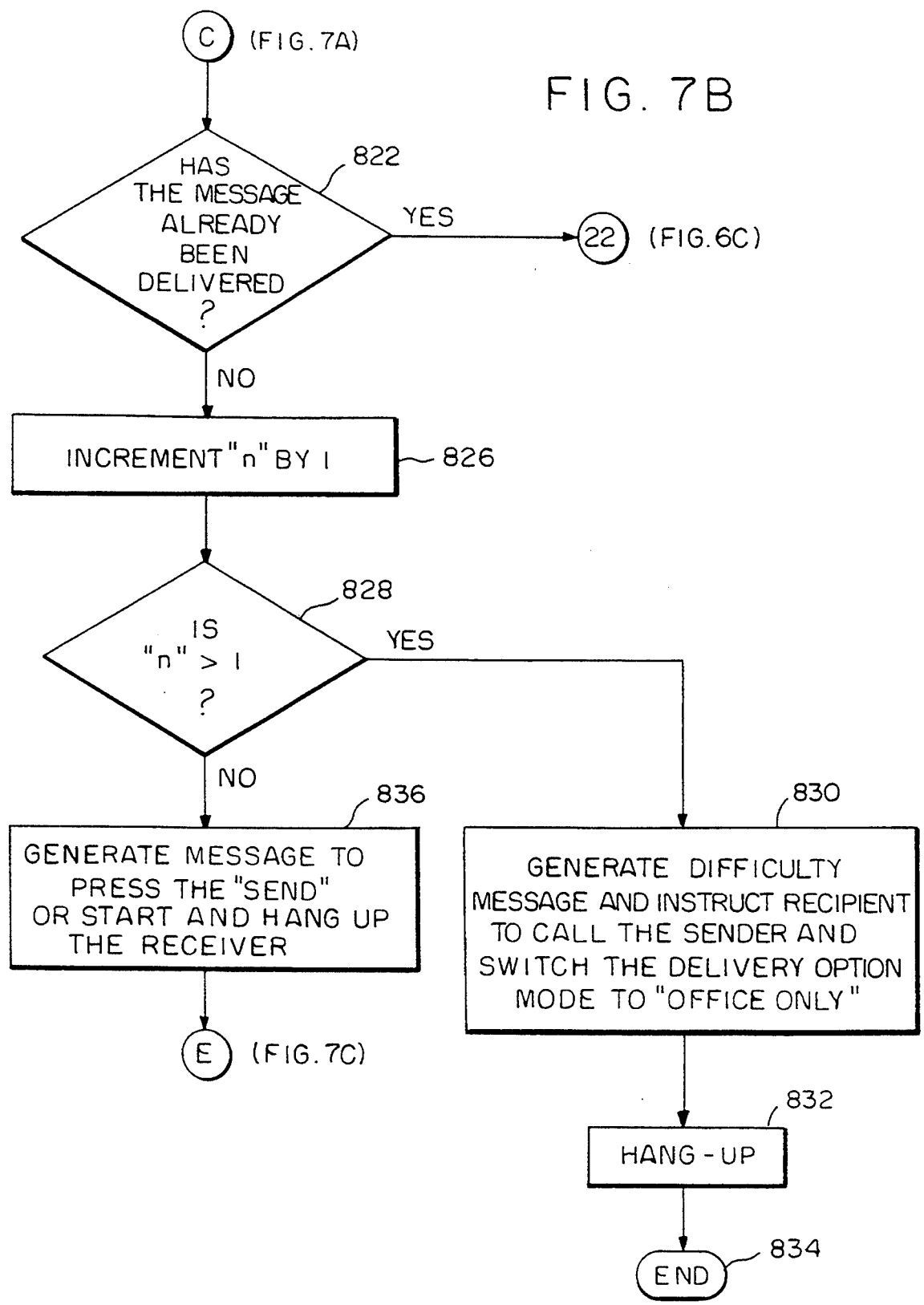

METHOD AND SYSTEM FOR STORAGE AND/OR TRANSMISSION OF CONFIDENTIAL FACSIMILE DOCUMENTS

FIELD OF THE INVENTION

The present invention relates to a method and system for transmission of confidential documents and the like via facsimile machines. More specifically, the system includes a security code-responsive, computer-controlled store and forward facility (SAFF) for receiving and transmitting documents between two remote facsimile machines. A security code number is provided by the sender (originator) of the fax for each document transmission. Thus, the number does not identify a subscriber or a mailbox but identifies a fax message. Various degrees of security may be provided.

BACKGROUND OF THE INVENTION

The electronic transmission of documents by way of facsimile (fax) systems employing public and private switched telephone networks has become both commonplace and, often, an essential component in many business activities. It is estimated that the current number of facsimile machines in the United States is over 12 million and the number is expected to grow to over 25 million by 1995. In view of the large amount of facsimile documents sent each day, a number of these facsimiles may be erroneously sent or received by unintended parties. This can lead to serious repercussions if the document being transmitted was of a sensitive or confidential nature. Documented facsimile transmission errors which may lead to the compromise of sensitive documents include: (i) dialing the wrong facsimile number or punching the wrong button on a pre-programmed automatic dialer, or (ii) sending the facsimile to the right number, but having an unintended party pick up the facsimile on the receiving end.

There are many businesses, such as CPA firms, banks, stockbrokers, etc., as well as many personal situations, where confidentiality of facsimiles may be important. The risks of an improper or misdirected facsimile transmission are of particular concern to attorneys. Sending a sensitive document to the wrong facsimile number may breach an attorney's ethical duty to maintain the confidentiality of his client. Since the ethical code extends the duty of confidentiality to an attorney's employees, this risk is broadened each time an attorney delegates the responsibility for faxing a document to another party. Aside from the ethical consideration, a misdirected or errant fax may also forfeit the attorney-client privilege. Since a privileged communication must be intended as confidential, a wayward fax sent to the wrong number or to a third person may destroy this privilege. In addition, the risk of a carelessly sent fax may result in legal malpractice or the loss of clients. Additionally, many documents sent to a recipient may not be privileged, but contain highly sensitive information the recipient does not want revealed to anyone except himself and any authorized person(s).

Pre-programming frequently used telephone numbers into a fax machine's automatic dialer may help eliminate misdialing, but hitting the wrong button can also create severe problems. If an otherwise privileged fax communication is inadvertently communicated to an unauthorized third person, the situation may be analogous to that of an eavesdropper.

Even if a fax is sent to the right party, problems of confidentiality still may occur when the receiving party is not physically present at the time of transmission or an unauthorized party retrieves the document. This is often a problem, especially in a busy office or where a machine is nominally unattended during the transmission, in that the originator has no control over who may be standing by the machine when the document prints out or who may leaf through a stack of faxes piled up in a hopper right after lunch.

This security problem is exacerbated when it is desired to deliver fax documents to a recipient who is not currently available through a known machine (e.g., a person on a business trip). This is a very inconvenient situation in that it requires that the paper documents be held until the traveler phones in from a remote machine. It further requires that the document be sent to a non-secured site, such as the front desk of a hotel. This leaves many opportunities for the confidential fax to be seen by unauthorized eyes.

Careless and misdirected fax transmissions can mean loss of dollars for interested parties and possible claims of legal malpractice for attorneys.

There are products and methods currently available to reduce the risk of misdirected facsimiles. One method is to require that a responsible person directly monitor the sending of a facsimile, while a person at the other end simultaneously monitors the receipt of the facsimile. This can be administratively burdensome and in some cases not practical for the user or recipient.

Specialized secure facsimile machines are currently available that scramble outgoing fax signals and unscramble incoming ones. One of the benefits of such scramblers is that if an operator misdials or misroutes a fax, the message is not sent. Among the drawbacks are the fact that such machines are expensive, with an average price tag of over $1,000, and they work only if the other party has the same brand of scrambler.

Another security method uses message authentication codes by means of a calculator equipped with a special chip that assembles and disassembles the codes to verify faxes.

Various communication systems which address some of the above concerns are known in the facsimile art. The patent to Gordon et al., U.S. Pat. No. 4,994,926, discloses a system and method for facilitating facsimile transmissions which includes a store-and-forward facility. The originator sends a fax to the store-and-forward facility and advises the facility of the destination fax number. The store-and-forward facility then spools all faxes for the intended machine and forwards the fax messages to the destination machine. Gordon specifically addresses the security problem of faxes and includes a feature by which the originator may designate a particular fax transmission as being a secure transmission. In this case, the store-and-forward facility notifies the intended recipient that a secure fax is waiting in his "Mailbox". The intended recipient must then telephone the store-and-forward facility and enter his personal identification number (PIN) before the store-and-forward facility will send the fax to the recipient's fax machine. The secret PIN number is assigned by the store-and-forward facility to each individual recipient subscriber. The number does not identify a message but identifies the subscriber. Thus, all recipients must be subscribers to the system and there is only one security code per subscriber.

The Gordon system suffers the deficiency that a recipient must be a subscriber before he can receive such faxes. It would be desirable to have a system which could be used by anyone, regardless of whether or not he or she is a subscriber. Furthermore, by assigning one security code per subscriber, if an unauthorized person obtains a subscriber's security code by covert means, that person can retrieve all confidential messages of that subscriber.

U.S. Pat. No. 4,935,955 to Neudorfer discloses a facsimile PBX system employing a security feature which allows only the authorized recipient of a message to access the incoming facsimile transmission. Access can be achieved by entering a password at the designated recipient's facsimile terminal, and only the messages designated for that particular recipient can be accessed from storage in an interface unit. This type of security is similar to that of Gordon, in that the password is unique for each designated recipient, not for each message. Furthermore, the password is generated by the recipient, whose office owns the facsimile PBX system.

The patent to Scherk et al., U.S Pat. No. 5,068,888, discloses an information delivery system for automatically delivering information from a control information storage facility by means of facsimile transmission to a facsimile machine positioned at a remote location. The particular information requested must be identified by appropriate identification codes. A caller desiring to access information from the information delivery system (such as a library) calls the system, gives at least an identification code for the documents selected for delivery and a telephone number of the user's facsimile machine. The system may verify that the user is authorized to access the requested documents. Thus, specific passwords may be used to access special documents. However, this is not a system for delivery of fax messages from a sender to a recipient. Furthermore, it is not intended for individual documents. Thus, Scherk does not solve the confidentiality problems discussed above.

Kurokawa U.S. Pat. No. 4,607,289 discloses a transceiver having a data storing and relaying function in which data and facsimile data transmitted thereto from a remote facsimile station is stored and then transmitted to a second remote facsimile station which is designated by the first remote station. The transceiver accepts a data reading request from the first remote station only when registered identification data coincides with identification data which is included in a control signal transmitted to the intermediate transceiver from the first remote station. This system is also in the nature of a facsimile mailbox system and does not solve the problems discussed above for a sender who desires to send a confidential fax to a recipient who is not a subscriber of the system.

Misholi U.S. Pat. No. 5,008,926 discloses a message management system comprising a system for producing a multi-media message, including a visual sensible portion and an aurally sensible portion. This patent is similar to the previously mentioned Gordon et al patent, U.S. Pat. No. 4,994,926, in that the system comprises a mailbox for a subscriber to receive either voice or fax messages. The system further gives the subscriber the ability to forward some, if not all, of the messages to another subscriber or to another designated number.

Wantanabe et al U.S. Pat. No. 5,170,428 discloses a data communication system having memory for storing data which is to be sent to multiple reception stations.

Furthermore, the following publications relate to facsimile communication transmission systems: "ITT Inaugurates FAXPAK," *Business Communications Review*, November–December, 1979, pp. 29–31; "Flexible Facsimile Transmission [FAXPAK]," *Telecommunications*, March, 1980, pp. 39–42.

None of the systems presently available adequately solves the important problem of preventing a sensitive fax document from inadvertently falling into the wrong hands due to the vagaries of facsimile transmission.

SUMMARY OF THE INVENTION

Accordingly, it is an object of the present invention to resolve the deficiencies of the prior art.

It is another object of the present invention to provide a facsimile transmission system which can be used by any originator to send a document for which security provisions are desired to any recipient, with the knowledge that adequate precautions will have been taken to ensure that the desired degree of security is in place.

It is a further object of the present invention to provide such a facsimile transmission system in which each document to be transmitted is assigned a security code by the sender and with the provision that the document cannot be forwarded until the intended recipient provides that security number, wherein the intended recipient can only learn that security number from the sender.

It is still another object of the present invention to provide such a security transmission system in which, after the recipient provides the correct security code, the system will only forward the document to a destination facsimile telephone number which has been provided by the sender.

It is yet a further object of the present invention to provide such a facsimile transmission system in which the intended recipient must telephone the system from a facsimile machine and provide the security code by voice from that telephone and in which the message can only be forwarded to that facsimile machine over the same open telephone line, thereby ensuring that the recipient is stationed at the machine at the time that the document is transmitted.

It is still a further object of the present invention to provide such a facsimile transmission system which notifies the intended recipient that a secure facsimile document is being held for that recipient and advises the recipient of the message number of that document so that the recipient can only receive the document by knowing both the security code and the message number.

It is an additional object of the present invention to provide such a facsimile transmission system in which the sender is notified either that the document was delivered or that it could not be delivered.

It is still an additional object of the present invention to provide such a facsimile transmission system which bills the sender of the facsimile document for the services rendered.

It is yet an additional object of the present invention to provide such a facsimile transmission system in which, at the highest level of security, the message will only be forwarded when the recipient calls the system from a facsimile machine telephone number, as identified by Automatic Number Identification (ANI), which number has previously been designated by the sender.

These and other objects of the present invention are achieved by the system and method of the present invention which will be described in detail hereinbelow.

In accordance with the present invention, the system may be accessed by any originator. Preferably, the fee for the services provided will be billed on the originator's telephone bill. The originator creates a security code number for the document being faxed. This security code must then be conveyed by the sender to the intended recipient, preferably directly by voice telephone and not by fax. The recipient cannot receive the document without knowledge of this unique security code created by the sender. This use of a security code shifts the burden of security and confidentiality to the recipient, for only he has knowledge of the retrieval security code (other than the sender). Therefore, it is the receiver who now assumes the responsibility for breach of confidentiality if he should choose to give the security code to a third person.

The system may include a plurality of different security modes from which the originator may select. All of the modes include the common feature of requiring the sender to select a security code which the sender must then convey to the intended recipient. Beyond this, in the most basic security mode, the recipient who calls the system to receive his fax message after providing the security code, may direct that the message be sent to any facsimile machine telephone number that the recipient designates. Preferably, even in this most basic mode, the sender will have provided additional identification of the intended recipient, such as the intended recipient's home or office area code and telephone number. Thus, the recipient must identify himself not only by the security code but also by this other identifying data. This will prevent interlopers from calling the system with random security codes to try to randomly retrieve confidential documents from the system.

This basic security level, known as the "Travel" mode, is particularly useful when the recipient is travelling away from his home of office and so the sender does not know what facsimile number may be used to retrieve the document. Thus, once the recipient is informed that such a document is awaiting his receipt, he may direct that this document be sent to a hotel fax number, for example.

In a second mode of security, which provides somewhat greater security than the "Travel" mode, the document will only be sent by the system to a facsimile number which has been designated by the sender. This will ensure that the message only goes to the office of the intended recipient and is known as the "Office Only" mode. In this mode, the message is identified not only by the security code provided by the sender but also by a message number created by the system. When a sender desires to send an "Office Only" mode message, he or she designates that mode and provides the security code as well as the recipient's telefax number. The sender then informs the recipient that such a message has been sent and tells the recipient what the security code is. At the same time, the system immediately sends a notification sheet to the intended recipient at the telefax number provided by the sender, informing the recipient that a secure message is awaiting his retrieval and advising the recipient the message number of the document as well as the telephone number which may be dialed in order to retrieve the document. In an alternative embodiment, the system may have reserved to it a sufficient number of telephone lines that the telephone number which the recipient calls to retrieve the document may be considered to be a unique number and may serve as a substitute for the message number. In either event, the combination of the message number with the security code creates a unique identification for the document. The existence of this unique identification will prevent inadvertent forwarding of the document to the wrong party. Furthermore, those who covertly learn the security code cannot retrieve the document without the message number and those who covertly learn the message number but are unaware of the security code also cannot retrieve the document.

Once the recipient is aware of the security code and the message number, he or she calls the number provided on the notification sheet and inputs the security code and the message number (and unless the message number is the telephone number). The system will then dial the recipient's facsimile number and transmit the document. If the recipient's facsimile number is busy or if the message cannot go through for another reason, such as if the recipient's machine is out of order, additional attempts will be made to send the document. In a preferred embodiment, only a specified number of additional attempts, most preferably one, will be made to deliver the document, after which attempts to deliver the document will be terminated and the document purged from the system. The sender will be advised that the message would not go through and the sender can then start the procedure anew, using a new security code if he so desires. This would prevent inordinate delays between the time that the recipient authorizes the transmission and the time that the transmission is actually made. If there are delays, the recipient may leave his office or the message may come in when no one is waiting for it, thus leaving the messages with all of the other fax messages of the day with the attendant security problems. Alternatively, the recipient can call the number provided on the notification sheet directly from a facsimile machine and request that the document be sent over the current connection. If this option is selected, the recipient need only press the "start" key after giving the proper identification information, and the document will be forwarded directly to the fax machine from which the recipient is calling.

An even higher level of security may be selected which will ensure that the intended recipient is physically stationed at the facsimile machine at the time that the message is being transmitted. This is known as the "In Person Only" mode. This mode proceeds in the same manner as described above for the "Office Only" mode, with the sender providing the security code and the intended recipient's telefax number and the system sending a notification sheet to the intended recipient with the message number and/or telephone number. The difference between the "In Person Only" mode and the "Office Only" mode is that, in the "In Person Only" mode, the system cannot originate the communication by which the document is transmitted to the recipient. The recipient must call the system from the telephone of a fax machine. After advising the system of the security code and the message number, the recipient pushes the send button on his fax machine and the system forwards the message to the recipient over that open line. As the system does not dial the number to which the document is being sent, it cannot be delivered to a wrong number. Furthermore, as the intended recipient must provide the security code and message number over the same line that the message is being transmitted, there is an assurance that the intended recipient or his designee is physically stationed at the facsimile machine at which the document is being transmitted. It is the recipient who is fully in charge of maintaining the security of the document which is transmitted, thus satisfying all of the duties of the sending party.

One additional optional degree of security may even be added to the "In Person Only" mode. In this embodiment, not only must the intended recipient call the system from a facsimile machine, he must call it from the specific machine, the number of which was provided to the system by the sender. The system determines the telephone number from which the intended recipient's call was made by means of Automatic Number Identification (ANI) also known as "Caller ID". Only if the call is being made from the recipient's facsimile number and the recipient knows the security code and the message number will the document be transmitted. In this embodiment, the message number may be eliminated, as the ANI identification of the recipient's telephone number will itself serve as the unique identification of the recipient in combination with the security code.

The details of the present invention will be better understood from a consideration of the following brief description of the drawings and detailed description of preferred embodiments.

BRIEF DESCRIPTION OF THE DRAWINGS

FIGS. 2A-2D show a flow chart according to the present invention.

FIG. 3 shows a flow chart for the selection of the security delivery option according to the present invention.

FIGS. 4A-4C show a flow chart for the entry of transmission information according to the present invention.

FIG. 5 shows an additional flow chart for the entry of transmission information according to the present invention.

FIGS. 6A-6D show a flow chart for the transmission of a previously stored facsimile according to the present invention.

FIGS. 7A-7C show a flow chart for the transmission of a previously stored facsimile according to the present invention.

DETAILED DESCRIPTION OF THE PREFERRED EMBODIMENTS

Figure 1:
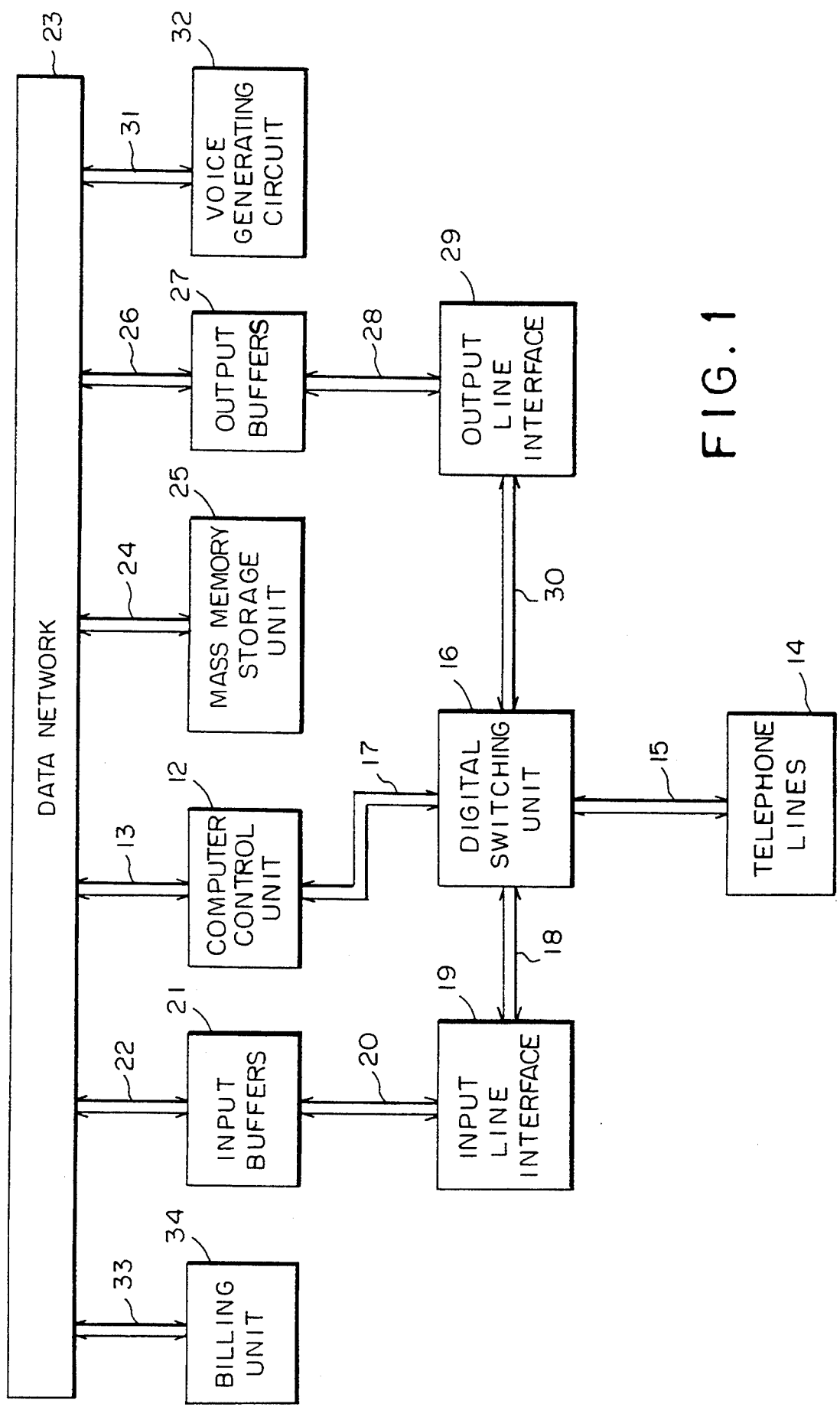
FIG. 1 shows the schematic for an system according to the present invention.
Figure 2A:
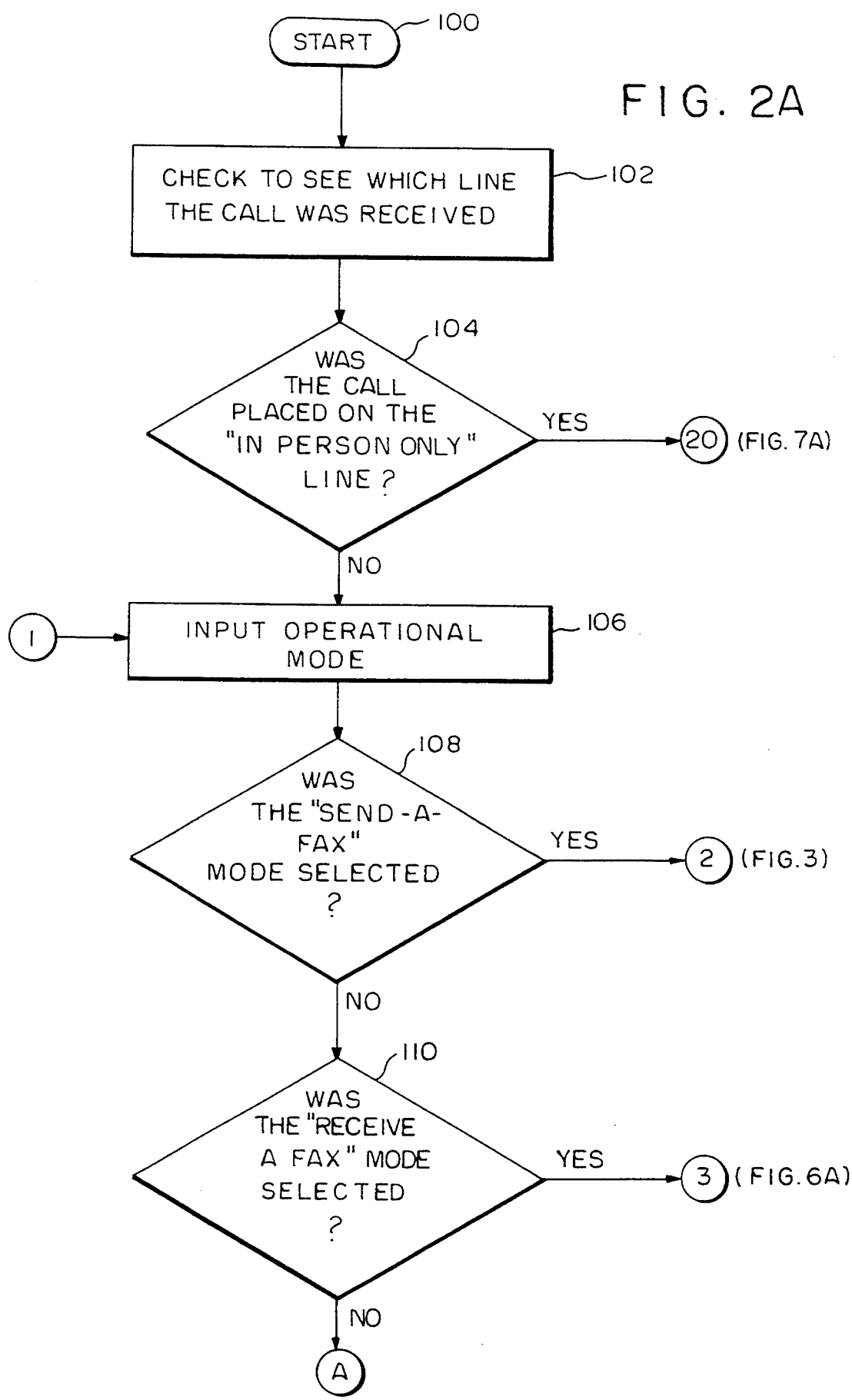
Figure 2D:
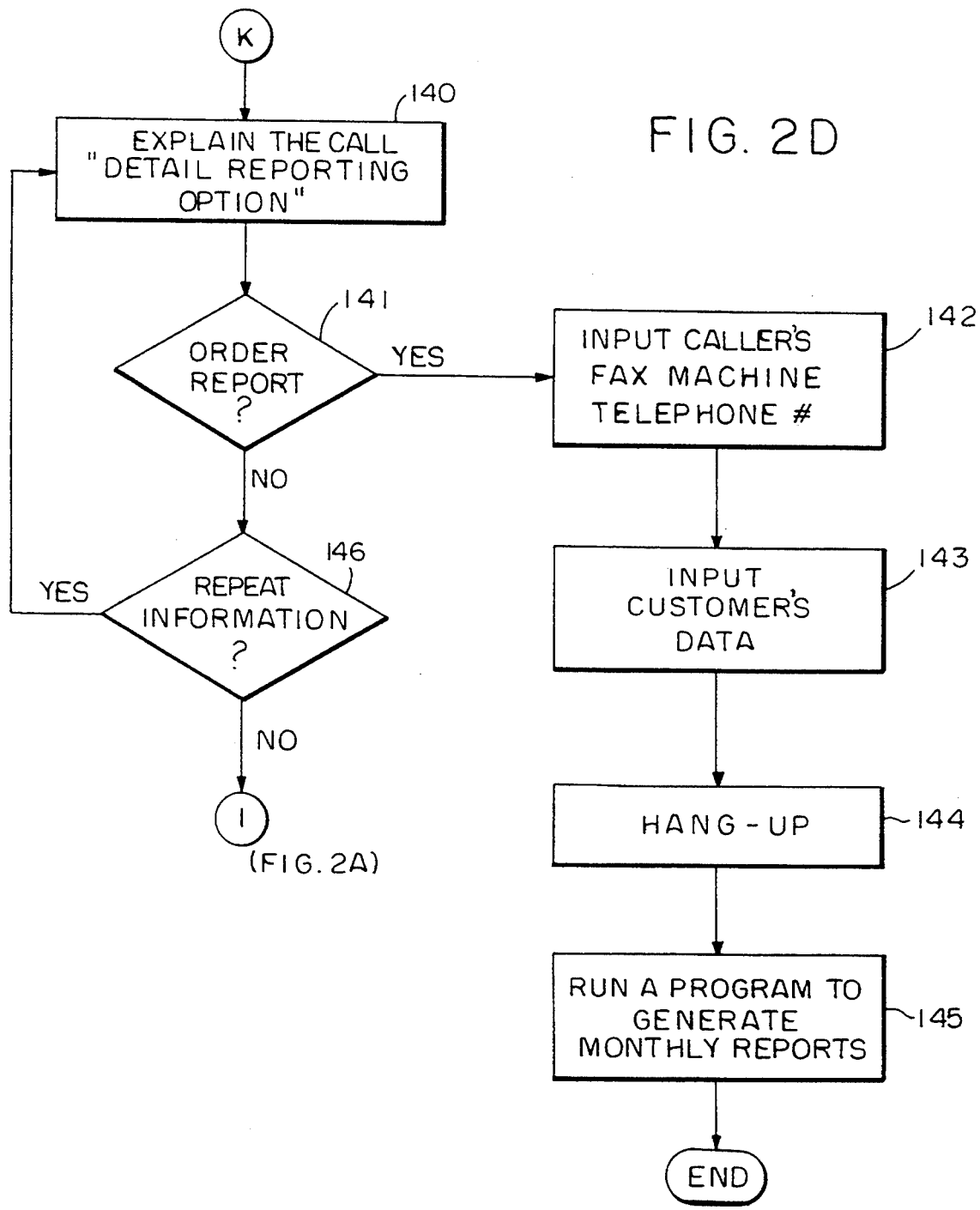

FIG. 1 shows the schematic of a system for a computer-controlled store and forward facility (SAFF) 10 for the receiving and transmission of facsimile documents. Public telephone lines 14 are connected to the SAFF system 10 via a digital switching unit 16. Data pertaining to facsimile documents travel over telephone lines 14 to the facsimile SAFF system line 15, is inputted through the digital switching unit 16 under their control the computer control unit 12. The computer control unit 12 determines, over line 17, whether the digital switching unit 16 relays information to an input line interface 19 or from an output line interface 29. The data relayed by switching unit 16 travels over data line 18 into the input line interface 19, where it is fed into input buffers 21 via data line 20. The input line interface 19 controls the flow of data into input buffers 21 so as to allow for maximum data transfer to the input buffers 21. The rate of transfer for the facsimile information is ultimately controlled by the computer control unit 12 over data line 13 and data network 23. Typically facsimile information traveling through the digital switching unit 16, line interface 19, and input buffers 21 will be information for the storing of facsimile documents and it's associated identifying information. A mass memory storage unit 25 receives, via data network 23 and data line 24, the facsimile information under the control of the computer control unit 12.

If the computer control unit 12 determines that the digital switching unit 16 is to relay information from the memory storage unit 24, the computer control unit 12 directs the mass memory storage unit 25 to output data via the data network 23, data line 26, and through output buffers 27. The rate of facsimile information for forwarding, from the mass storage unit, is determined by the output line interface 29 over data line 28. Output line interface 29 transfers the stored facsimile document information to the digital switching unit 16 via the data line 30. The digital switching unit 16 relays the stored facsimile document information from the output line interface 29 to the telephone lines 14 via data line 15. The stored facsimile document information will then be sent to a recipient via the telephone lines 14.

The digital switching unit 16 further functions as a flow through device between the telephone lines, i.e. either the recipient or the sender of the fax material, and the computer control unit 12. With the aid of a voice generation circuit 32, the computer control unit 12 indicates to the caller via lines 14 the necessary instructions for either storing a facsimile document or for forwarding a previously stored facsimile document. The system 10 further includes a billing unit 34 for calculating the charges which will be charged to the sender of the original facsimile document. The billing information is generated from the information sent via the telephone lines 14 through the switching unit 16 and as requested by computer control unit 12. This information will include the sender's telephone number, the facsimile telephone numbers of the sender and the intended recipient and any client reference notations. Once the system completes a forwarding request via the recipient calling in for the stored facsimile document, the computer control unit determines the total charges for the facsimile document and the number of facsimile pages forwarded. This information is then compiled and billed to the sender's telephone number via lines 14.

It will be understood that the data network 23 permits the functional components of the system to be physically distributed in a plurality of locations. Alternatively, all of the functional components may be at a single location with the data network 23 being a data bus.

Figure 6A:
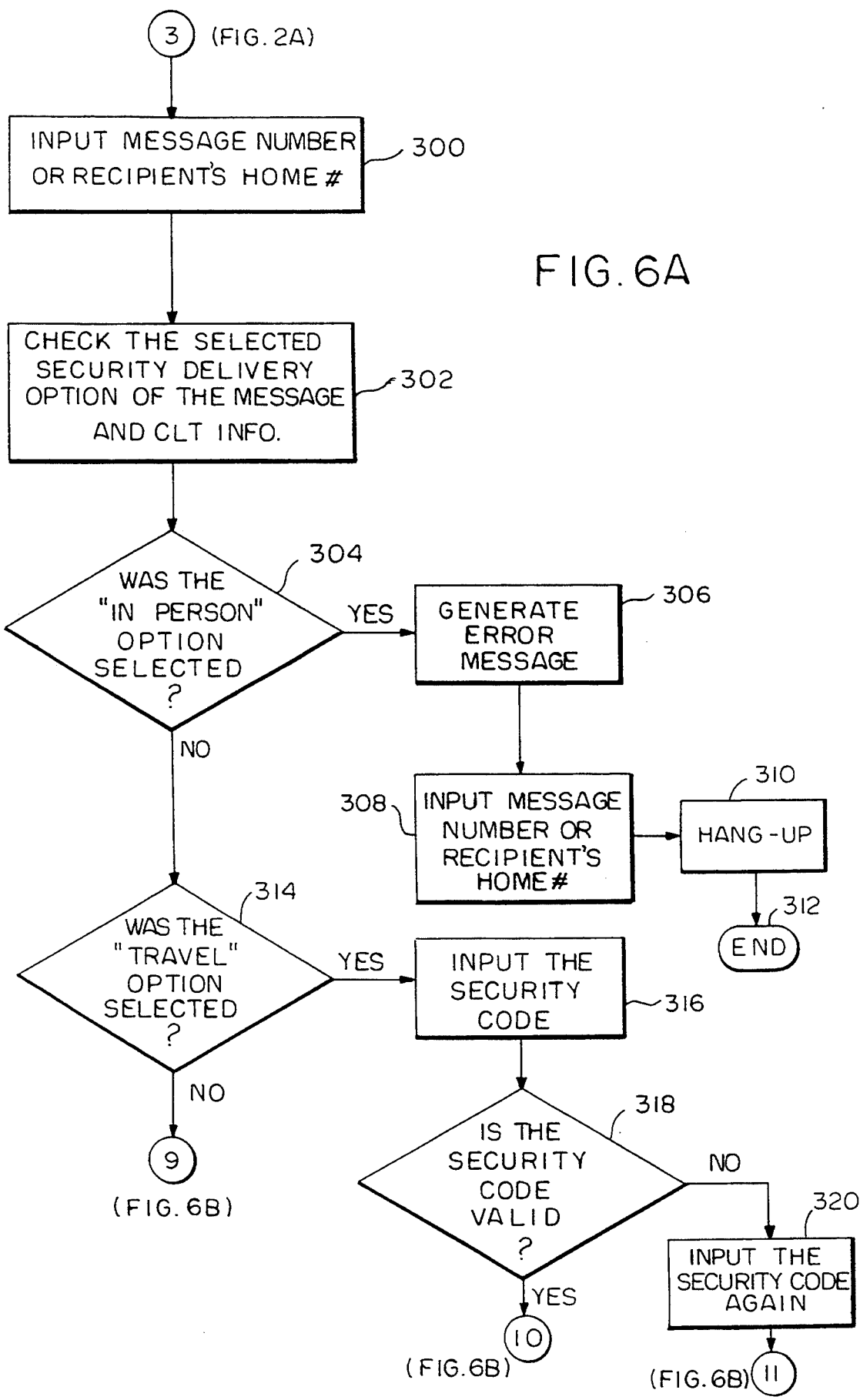
Figure 6C:
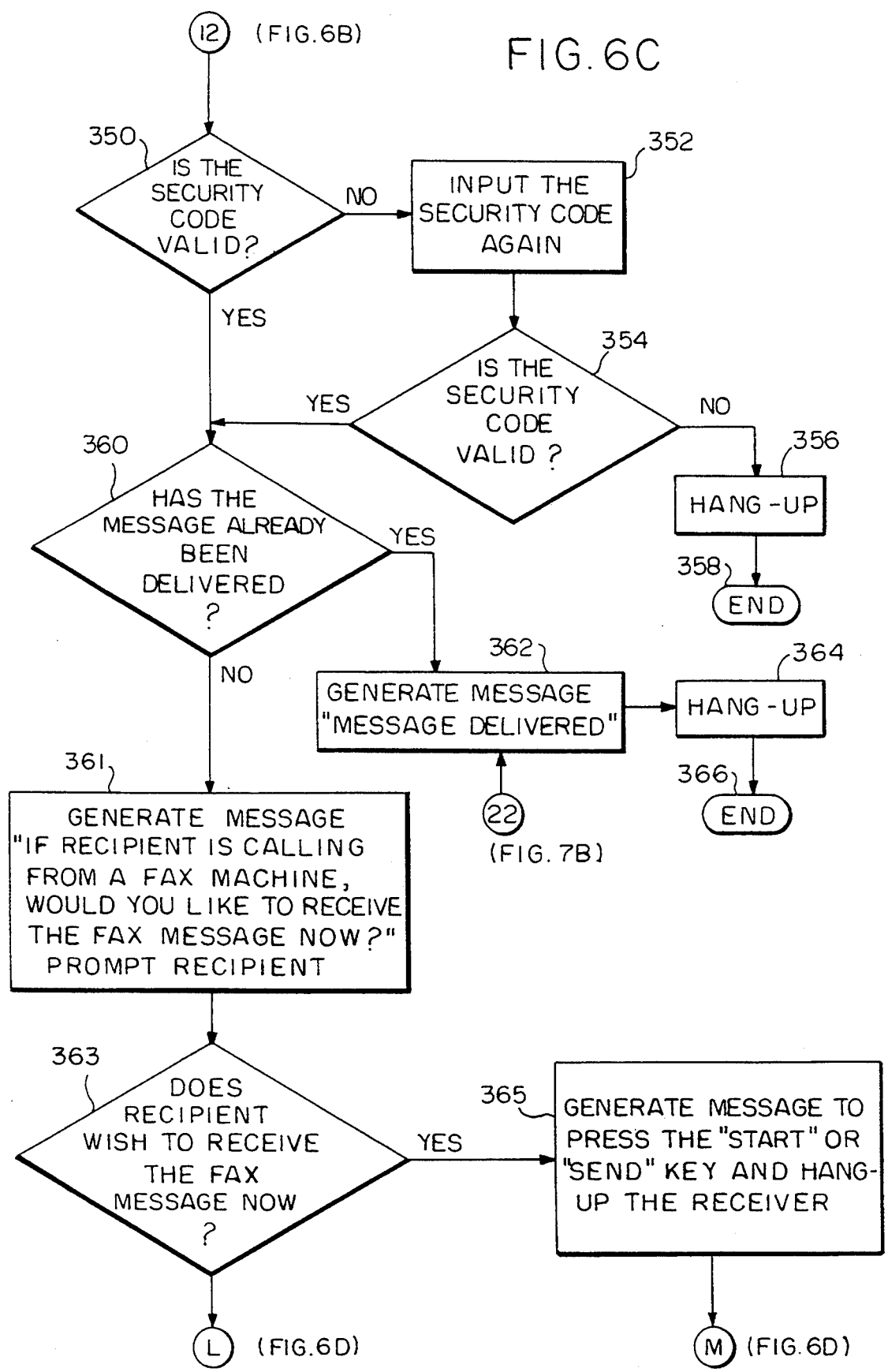
Figure 6D:
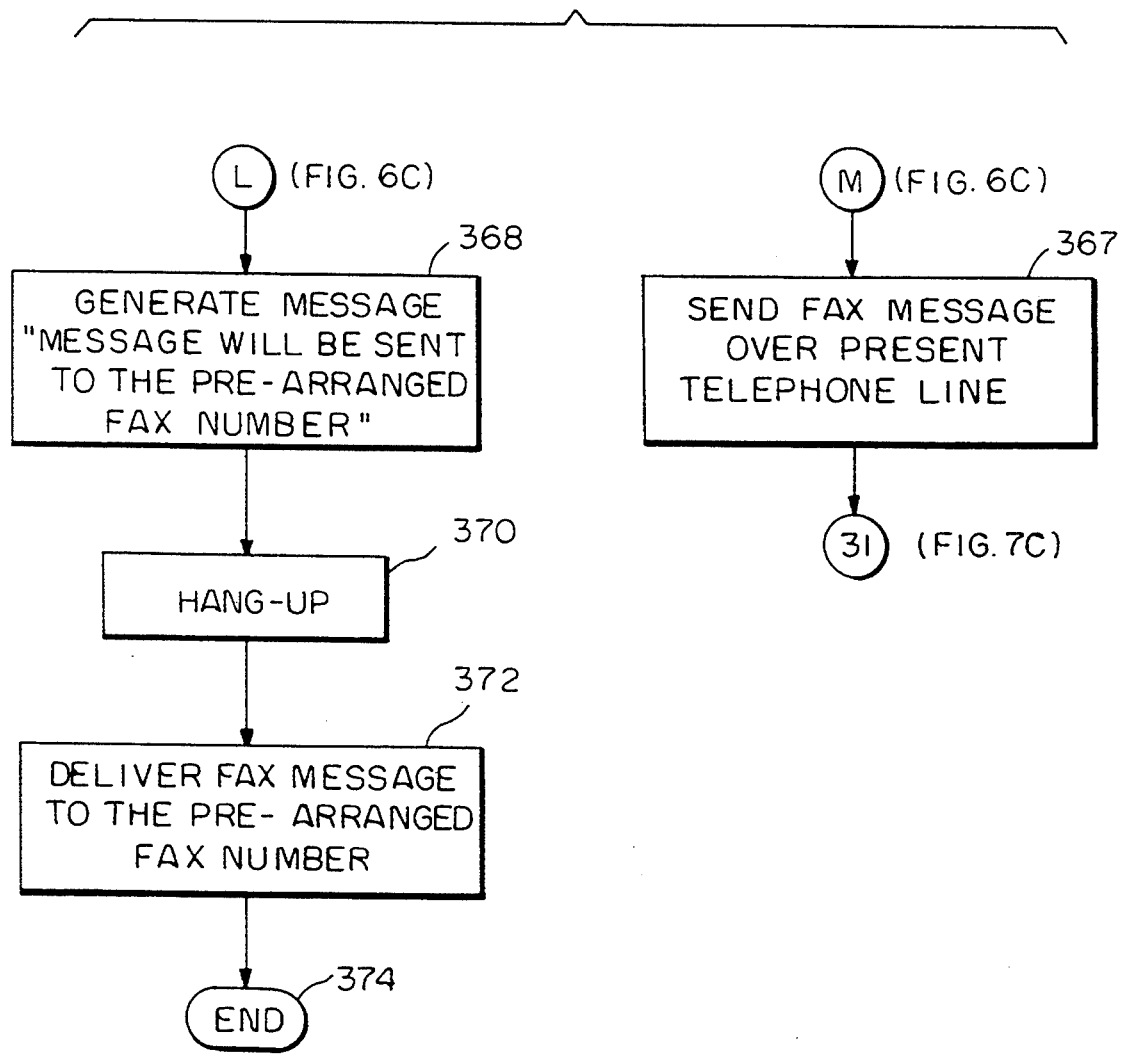
Figure 7C:
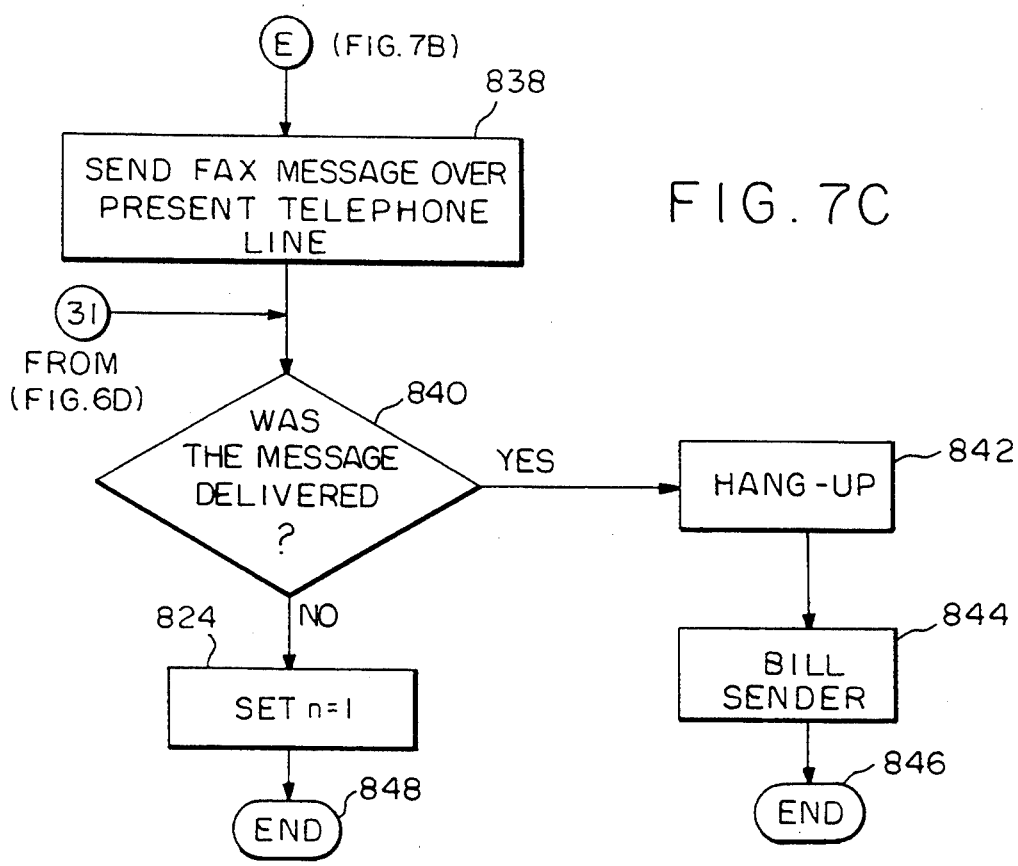
Figure 8:
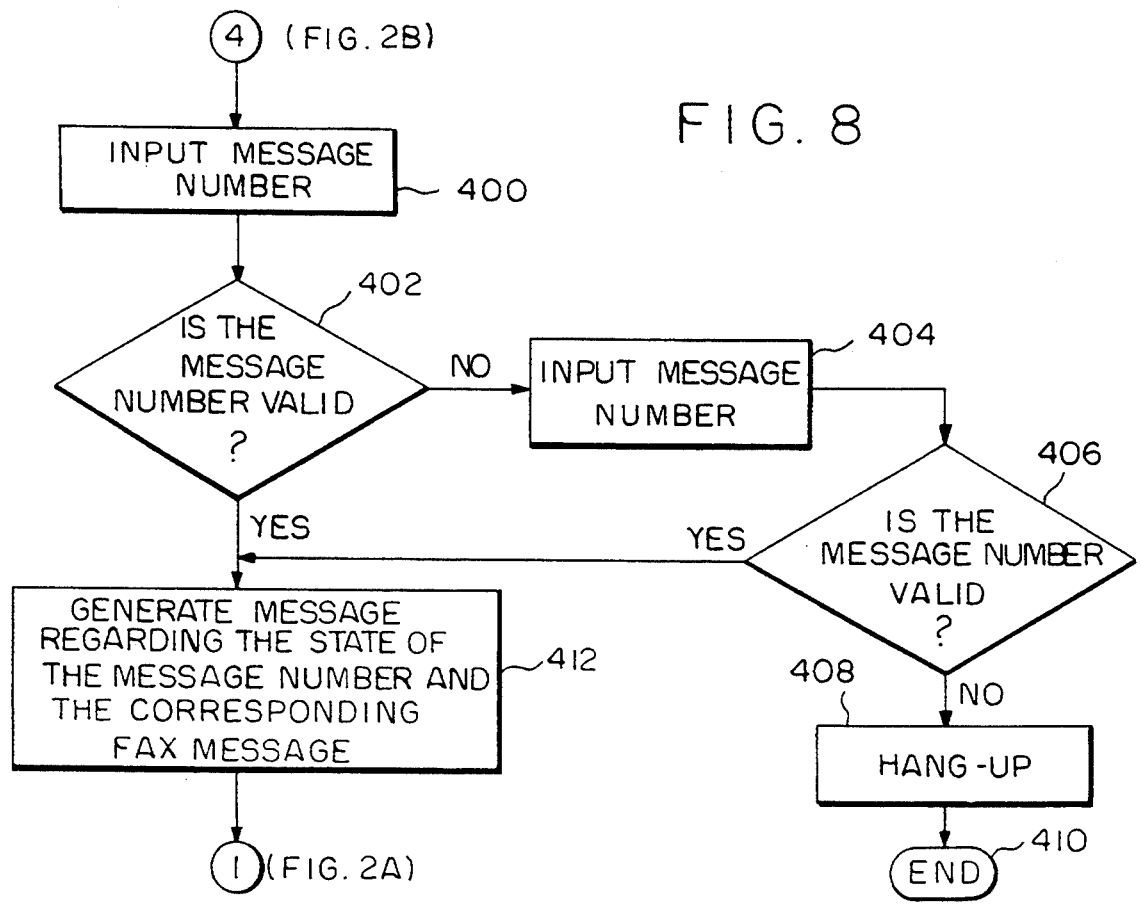
FIG. 8 shows a flow chart with the generation of a message status according to the present invention.

FIGS. 2A-2D show the main flow chart for the SAFF system 10. Once the SAFF system receives a telephone call via lines 14, the computer control unit 12 checks to see on which line the call was placed 102. If the telephone call was placed on the "In Person Only" line, the system diverts the call to a sub program as indicated in FIG. 7, which will be described hereafter. If the call received was not placed on the "In Person Only" line, the SAFF system then prompts the caller for an appropriate operational 106. The operational modes may include "send-a-fax", "receive-a-fax", or the check "delivery status mode". If a caller selected an operational mode 106 to send a fax 108 the main flow chart diverts the caller to the security delivery option selection flow chart as indicated by FIG. 3. If the caller wants to receive a fax 110, the main program diverts the call to a sub program for the delivery of a previously stored facsimile document, as shown in FIG. 6. Finally if the caller wants to check on the delivery status 112 of a previous stored document, the main flow chart diverts the call to a sub program for checking the message status as indicated in FIG. 8.

If the caller fails to indicate a desired selection, the SAFF system explains 114 to the caller the complete system operation and prompts the caller with a series of questions so as to give the caller a better understanding of the system operation or hangs up. If a caller selects further information about the system 116, then the system explains additional detail about the system operation 118 and prompts the caller for his or her fax number to receive additional print material via their fax machine. By prompting the caller for his or her fax number the system does not tie up valuable processing time and generates a report which can be easily read by the caller via their fax machine. If the SAFF system 10 receives the fax number as prompted, it instructs the caller to hang up the telephone and generates a report regarding the system operation 130. The system then calls the fax number 131 and then begins to fax the complete information regarding the SAFF system 132 and hangs up 133. If the caller did not want to receive further information on the SAFF system, the caller is then asked if they want to order a detailed report. If the caller wishes to order a detailed report, a full explanation regarding the detailed report is generated 140. The SAFF system has the capability of sorting out various calls received from the caller's fax machine and detailing these calls back to the customer at regular intervals, i.e. every thirty days. This SAFF system can sort out calls by the designated fax number or by the additional reference codes given by the original sender. If the caller wishes to receive this report 141, the caller is then asked to input the fax machine telephone number 142 and the customer's specific data that they want to sort 143 and then is requested to hang up 144 so as to allow the SAFF system to sort out the material of the previously stored facsimile documents and generate a report 145 to be faxed or mailed to the customer as indicated such as, for example, on a monthly basis. If the caller did not order the report after hearing the detailed reporting explanation the caller is then prompted with a question to repeat the detailed report or to exit. If the caller wishes to hear the explanation again 140 the system starts at the beginning, as far as the explanation on the detailed reporting option. However, if the caller selects "no" on hearing the detailed reporting option explanation, the caller is then referred back to the main program which prompts for the operational mode 106.

FIG. 3 shows the base flow chart for the security delivery options 200 for facsimile documents. Once the caller has indicated that they wish to transmit, for storage, a facsimile document, the caller is prompted with a series of questions to select the security option which will determine how the stored facsimile document will be forwarded. The SAFF system 10 supplies three possible security options for a caller to store with a facsimile document The options are "In Person Only" "Office Only" and "Travel". If the caller has selected the highest security option of "In Person Only" 202, the flow chart then transfers the caller to a sub-program for the entry of transmission information for the facsimile document, as indicated in FIG. 4. When the caller has selected "In Person Only" option, the SAFF system registers this security option instantaneously and stores it with the additional information which will be transmitted with the facsimile document to the SAFF system.

If the caller has selected the "Office Only" security option, the program then refers the caller to a sub flow chart program as indicated in FIG. 4. Likewise once the caller has indicated the "Office Only" option, the SAFF system automatically registers this level of security and stores it with the additional information regarding the facsimile document which will be obtained in a further sub program as indicated in FIG. 4. If the caller has selected the lowest security option available which is the "Travel" option, the caller is then referred to a sub program for the entry of transmission information as indicated in FIG. 5. If the caller has not selected one of the above security delivery options, the SAFF system automatically explains in full detail the available security options 208 and starts the prompt for the selection of security delivery options again 200.

FIG. 4 shows the flow chart for the entry of transmission information regarding the facsimile document. A caller requesting to send a facsimile via the security modes of either "In Person Only" or "Office Only" is then asked to input information about the intended recipient of the facsimile document 500. The system then prompts the caller/sender of the facsimile document to input a personal identification number security code. This security code is one that is selected by the sender of the facsimile document and may be of any random choice of numbers consisting of a plurality of digits, characters, or a combination of both, preferably a four digit number. The sender of the facsimile document then is prompted for additional reference codes if they so desire, i.e. particular docket numbers or billing information codes.

The system then explains the retrieval requirements for the selected security delivery option. This explanation is given such that the sender of the facsimile document has the knowledge in order to inform the intended recipient of how to retrieve the facsimile document from the system. For example, if the sender of the facsimile document has selected the "In Person Only" security option, the system then explains that in order for a recipient to retrieve this facsimile document they must 1) be at the location of the identified fax number, 2) call in on a special telephone number identified as such for "In Person Only", and 3) must input a security code which was selected by the sender of the facsimile document.

The sender is then prompted for the receipt option. This option gives the sender the ability to have a certified record that a facsimile document was received by a particular recipient. If the sender does request a return receipt 508 then the SAFF system generates a return receipt when the facsimile is received by the recipient 510 and sends this receipt to the sender of the facsimile document. However, if the sender does not request that a return receipt be delivered, the system then proceeds to generate a message number 512, whether or not the sender did or did not request a return receipt. The SAFF system then prompts the sender to input his or her telephone number 514 then requests that the sender send a facsimile document by pressing the send key on the facsimile machine. The facsimile document is then stored 516 with the security delivery option, the security personal identification number, the message number, and the additional client information. The system then proceeds to disconnect 518 the sender from the telephone line system and is in a ready mode to either receive additional facsimile documents or is in a mode to have documents retrieved. The system then notifies the intended recipient that a facsimile document is waiting to be forwarded. This notification is done by the SAFF system calling the facsimile telephone number, entered by the sender, and sends a delivery notification sheet to the facsimile machine of the intended recipient. An example of this notification sheet may be found in Example 1.

telephone number. The SAFF system then requests the sender to input a security code 604, and then proceeds to check to see if the combination of the identification information, i.e., the recipient's home telephone number and the security code, are unique 606. If the combination of the recipient's home telephone number and the security code is not unique, as would be determined by a system check 606, 608, the SAFF system then requests the sender to input a new security code 610. The SAFF system then repeats the system check 606, 608 until a unique combination of identification information is found. The SAFF system will not proceed further until the sender finally inputs a security code which leads to a unique combination which would distinguish the pres-

| DELIVERY-NOTIFICATION SHEET | |
|---|---|
| | (Company LOGO-PCX FILE) ATTENTION, ETC. |
| TO FAX #: | (Recipient's Fax #) |
| DATE: | (Sender's Local Date) |
| TIME: | (Sender's Local Time) |
| FROM: | (Sender's CSID) |
| SENDER'S FAX #: | (Sender's Fax Number) |
| SENDER'S PHONE #: | NPA-NNX-NNNN |
| SENDER'S REFERENCE #: | (Client ID-Optional) |
| MESSAGE #: | (NNN-NNNN) |
| TO RETRIEVE THIS DOCUMENT | |
| (IN PERSON CALL) PLEASE CALL, TOLL FREE: Appropriate Delivery System Number NOTE: THIS CALL MUST BE PLACED FROM YOUR FAX MACHINE!!!! (OFFICE ONLY & TRAVEL) PLEASE CALL, TOLL-FREE: 1-800-555-5555 (OFFICE ONLY) NOTE: THIS CALL MAY BE MADE FROM ANY TOUCH TONE PHONE; THE RECEIVING PARTY WILL NEED THE MESSAGE NUMBER APPEARING ABOVE. (TRAVEL) NOTE: THIS CALL MAY BE MADE FROM ANY TOUCH TONE PHONE; THE RELIEVING PARTY WILL NEED THE AREA CODE AND PHONE NUMBER OF THE FAX MACHINE TO WHICH THIS DOCUMENT IS DELIVERED. (ALL OPTIONS) YOU WILL BE ASKED TO DIAL A SECURITY CODE: IMPORTANT-This Security Code Has Been Selected by the Sender and is REQUIRED to Receive this Document. If You Don't Have the Code, Call the Sender, Not COMPANY! | |

By using a plurality of telephone lines 14, the system 10 has the ability of running several program sequences at once. For example, a plurality of incoming facsimile documents may be in the process of being stored, while a plurality of previously stored facsimile documents may be in the process of being retrieved.

If the notification is not sent, either due to a busy signal on the intended receivers facsimile line or for whatever other reason, the system will attempt to re-send the notification after five minutes 524. If this second attempt is successful, the system then tags the stored facsimile document with a date-time stamp 534 and ends this program sequence. However, if the second attempt is not successful 526, the system then purges the stored facsimile document 528 and notifies the sender that the system was unable to send the notification and that the sender must re-send the facsimile document to the SAFF system for forwarding.

FIG. 5 shows an additional flow chart for the entry of transmission information. If the sender has requested the "Travel" delivery option, the SAFF system prompts the sender 600 for additional information about the recipient, i.e., a fax number where the delivery sheet can be sent or a home telephone number of the recipient. In the "Travel" delivery option the sender is additionally requested to input specific identification information 602 regarding the recipient. This identification information may be in the form of the recipient's home ent facsimile document from all previously stored facsimile documents which are still in the system, i.e., have not been purged following delivery or for some other reason. Once it is established that the combination of the recipient's home telephone number and the security code created by the sender is unique 608, the system then proceeds to request the standard information that is retrieved in the above description of the "In Person Only" and "Office Only" modes.

It should be understood that the recipient's home telephone number is just one example of the type of identifying information other than the sender-created security code which may be used. Other examples are the recipient's office phone, birthdate, the numerals corresponding to the recipient's name on the telephone pad, etc.

FIGS. 6A–6D show the flow chart for the forwarding of a previously stored facsimile document which was selected to be delivered via the "Office Only" or "Travel". Once a facsimile document has been stored in the SAFF system, the system then notifies the intended recipient that a facsimile document is waiting to be forwarded. This notification may take the form of a delivery notification. An example of this sheet can be found in the above Example 1 and is self-explanatory.

Once the SAFF system has identified that the caller wishes to receive a fax 110, the system prompts the caller to input a message number or the recipient's home telephone number 300. By the inputting of the message number or the recipient's home number, the system can check the delivery status that was selected by the original sender of the facsimile document 302. If the SAFF system determines that the corresponding message number is for an "In Person Only" facsimile document 304, an error message is delivered to the recipient over the telephone lines. This error message can be in the form of a voice communication generated by the voice generation circuit 32 under the control of the computer control unit 12 or it may be a message in the form of a fax document. However, in either case the system then prompts the caller again to input the message number or recipient's home telephone number 308. The SAFF system then proceeds to disconnect the caller from the SAFF system 310 and ends the program 312. The primary purpose of disconnecting the caller from the SAFF system is to insure the security of the facsimile document which requires that the caller calls from the machine which was previously registered by the sender of the original facsimile document, and on the designated "In Person Only" telephone line. If the system determines that the stored facsimile document associated with the message number was not stored under the "In Person Only" security delivery option, it then checks to see if the "Travel" security delivery option was selected by the original sender 314. If the facsimile document was stored under the "Travel" option, the recipient is then asked to input the security code associated with the particular stored document 316 which had been created by sender. If the security code matches 318 the previous security code selected by the original sender, the system then prompts the caller for a fax telephone number at which the SAFF system can complete the forwarding of the stored facsimile document 328. It is again noted that any document stored under the "Travel" security delivery mode has the option of having a stored facsimile document delivered to any facsimile machine just as long as the security code matches the security code originally set and stored by the sender of the facsimile document. If the security code inputted by the recipient does not match the previously stored security code, the system goes through a series of checks. The recipient is asked to input the security code again 320 and if the security code matches the one previously set by the sender 322, it process to forward the previously stored facsimile document. If the second attempt is unsuccessful, the SAFF system disconnects the recipient 324 and ends the program 326.

Once the system determines that the security code is valid and having received the fax number, the system acknowledges to the recipient the receipt of the fax number and instructs the caller to hang up The SAFF system then delivers the stored facsimile document 334 to the fax telephone number specified by the recipient and the program ends.

If the system determines that the previously stored facsimile document which corresponds to the message number inputted by the recipient was stored under the "Office Only" security delivery mode, it then checks to see if the message number is a valid message number 338. If the message number is valid, the system then prompts the caller to input the security code which was previously created by the sender of the facsimile document. If the security code is valid 350, the SAFF system checks to see if the message has already been delivered 360. If the message has not been delivered, the system generates a message to the recipient, via the handset, that the stored facsimile document can be delivered to the recipient immediately if he or she is calling from a fax machine. The SAFF system then prompts the recipient to input whether or not the call is being placed from a fax machine 361. If the recipient is calling from a fax machine and wishes to receive the fax document immediately 363, then the system generates a message to the recipient to press the "start" or "send" key and to hang up the receiver 365. The system then proceeds to send the fax document over the open telephone line 367 and checks to see if the message was delivered 840. If the fax message was delivered, the system disconnects itself from the line 842 and bills the sender of the fax document 844, and the program ends 846. However, if the SAFF system determines that, for some reason, the facsimile machine cannot be immediately accessed by the SAFF system, the SAFF system sets the N-counter to 1 on a first attempt 824 and the program ends 848. For any subsequent attempts, the system generates a voice message instructing the intended receiver to call the sender of the fax document and have the sender switch the security delivery option back to the "Office Only" mode.

If the intended recipient is not located at a fax machine 363, a message is generated by the SAFF system which informs the recipient that the stored facsimile document will be sent to the prearranged fax number 368. This fax number was originally designated by the sender of the facsimile material. Once the caller has been disconnected from the system 370, the SAFF system then delivers the stored facsimile document 372 to the prearranged facsimile number and the program ends 374.

The system has several security checks to make sure that the message number and the security codes are valid. If the message number is not valid, the recipient is asked to re-enter the message number 340 and the system checks 342 to see if the message number is valid. If the message is not valid, the caller is then disconnected 344 from the system and the program ends 346. Similarly with the security code, if the security code is not valid, the SAFF system gives the intended recipient one more chance to input a correct security code 352. If at this time, the security code still remains invalid 354, the system then disconnects the caller 356 from the SAFF system and the program ends 358.

To prevent multiple transmissions of a previously stored facsimile document, the SAFF system checks to see if a message has already been delivered 360. If the message has been delivered, the caller is then notified the message was delivered 362 and the system immediately disconnects the caller from the system and the program ends 366.

If the caller calls on a special designated "In Person Only" telephone line 104, the system automatically diverts the call to a program associated with the highest security option of "In Person Only". The system prompts the caller to input a message number 800 and then checks to see if the message number is valid 802. If the message number is valid, the caller is then asked to input the security code. Once again, the security code is the security code number which was originally created by the sender and stored with the facsimile document. If the security code is valid 813, the SAFF system checks to see if the message has already been delivered 822. As with the other options for message delivery the SAFF system seeks to ensure that the message has not already been delivered, thereby preventing an unauthorized user from receiving the stored facsimile document once the intended receiver discards any information which may lead to the discovery of the stored facsimile document. Preferably, the stored fax is purged by the SAFF immediately after transmission. Once the system determines that the stored facsimile document has not been delivered, it sets an internal counter of N=0. This counter is used to determine how many times the SAFF system will attempt to deliver the stored facsimile document.

As the system proceeds to attempt the delivery of the previously stored facsimile document, it sets the N counter to 1 on the first attempt 826 and does an internal check 828 to see if N is greater than 1. If N is less than or equal to "1" the system generates a voice message 836 to inform the recipient to press the send or start key on the facsimile machine from which he or she has called and to hang up the receiver. At this point, the fax document will then be sent immediately to the facsimile machine while the caller is presumably still standing near the facsimile machine. This is done without any interruption in the telephone line so as to maintain the highest level of security possible. If the attempt of the message delivery was successful 840, the SAFF system then disconnects from the facsimile machine 842 and generates a bill for the original sender of the facsimile document 844 via the billing unit 34 and ends the program 846. However, if the SAFF system determines that for some reason that the facsimile machine cannot be immediately accessed by the SAFF system, the SAFF system sets the N-counter to 1 on the first attempt 824. The SAFF system increments the N counter by 1 which causes N to be greater than 1. For any subsequent attempts, the system generates a voice message instructing the intended receiver to call the sender and have the sender switch the security delivery option to the "Office Only" mode. There may be several reasons why the system was not able to deliver the previously stored facsimile document. One reason may be that an unauthorized user may have gained access to the message number and the security code, but the SAFF system determined by means of Automatic Number Identification (ANI) that the number from which the SAFF is being called by the intended recipient does not correspond to the recipient's fax number provided by the sender. Another reason might be that the facsimile machine from which the caller was intended to receive the facsimile document, did not have the capability of having an immediate switch-over from voice communication to facsimile communications. In either case the system then disconnects the caller 832 and ends the program 834. As with the "Office Only" and the "Travel Fax" security delivery options the "In Person Only" security delivery option also has several internal checks to make sure that the message number and security code are valid. If the system determines that either one of these numbers are not valid after one additional attempt for each one, the system then disconnects the caller.

FIG. 8 shows a flow chart for the generation of a message status for a previously stored facsimile document. If a sender wishes to check on the delivery status of a previously stored facsimile document, the SAFF system then requests an message number from the sender of the previously stored facsimile document 400. Once determining that the message number is valid 402, the system generates a message regarding the state of the corresponding stored facsimile document, i.e., whether or not it has been delivered. To maintain the highest level of security for the SAFF system, even at this stage, the sender of the original facsimile document must have a valid message number; otherwise, the SAFF system will disconnect the caller from the system 408 and end the program.

Figure 9:
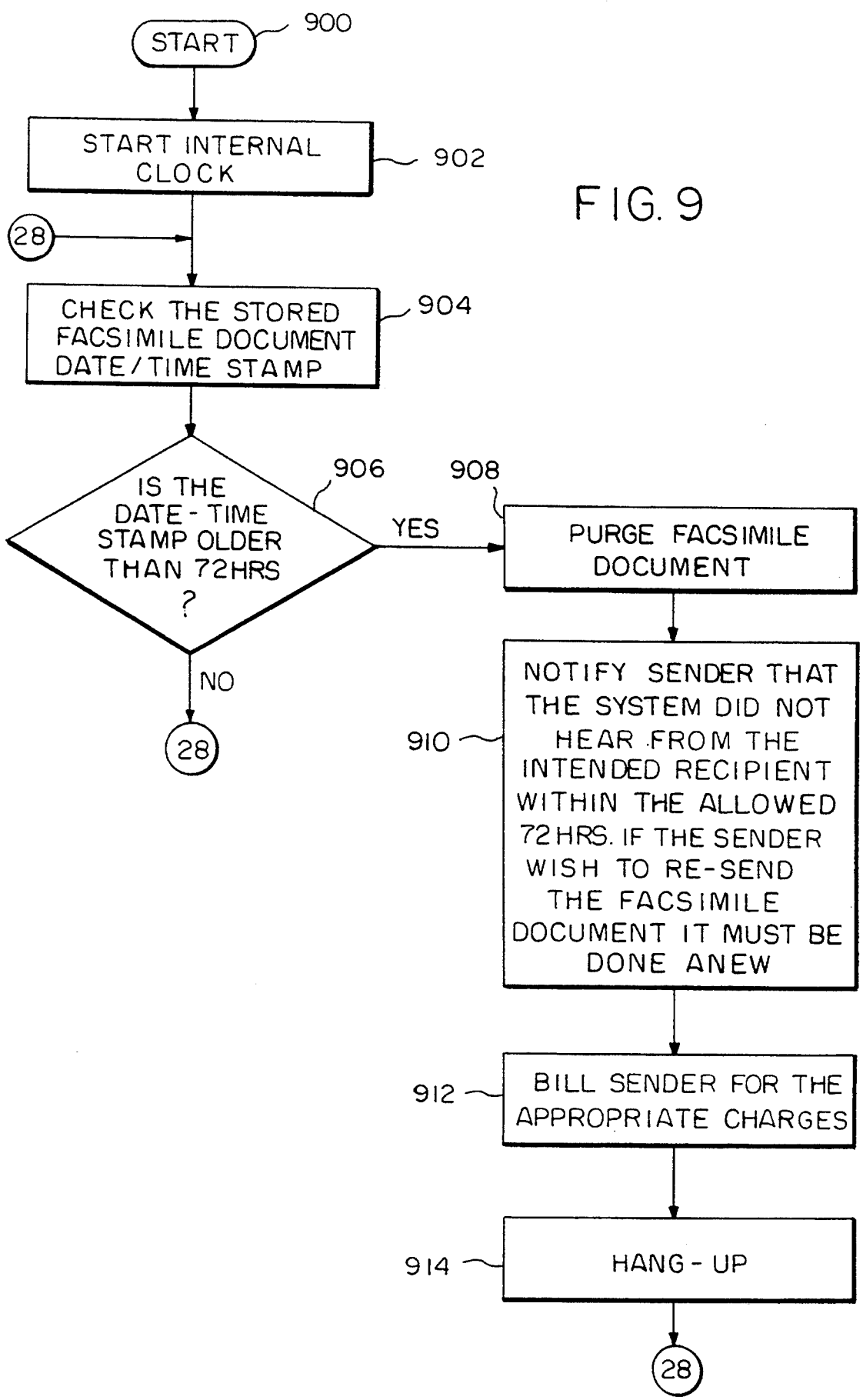
FIG. 9 shows a flow chart for stored facsimile document management.

FIG. 9 shows the flow chart for facsimile document control of previously stored facsimile documents. When the SAFF system is first initiated, this flow chart starts an internal clock 902 and checks all of the stored facsimile document's date/time stamp 904. The system then determines if this date/time stamp is older then 72 hours 906. If the date/time stamp for the stored facsimile document is older than 72 hours, the stored facsimile document is then purged from the system 908 and the original sender of the previously stored facsimile document is notified. The reason why the previously stored facsimile document is purged is to prevent unauthorized access to the stored facsimile document given the amount of time which has lapsed. The system notifies the sender that if he or she wishes to re-send the facsimile document, it must be done anew. Once the sender has been notified of the purged facsimile document, the sender is then billed for the appropriate charges relating to any toll charges which may have occurred in the attempt for the delivery of the facsimile document 912. The system disconnects and starts the checking of the previously stored facsimile documents over again. As long as the SAFF system is in operation the flow chart, as indicated in FIG. 9, runs continuously so as to keep fresh all facsimile stored documents.

After the delivery of previously a stored facsimile document, the sender is notified via a facsimile delivery sheet. An example of this sheet is found in the following Example 2.

| CONFIRMATION SHEET | |
|---|---|
| | (COMPANY LOGO-PCX FILE ATTENTION, ETC.) |
| YOUR FAXGUARD MSG #: | NNN-NNN-NNNN |
| TO FAX #: | (Recipient's Fax #) |
| REFERENCE: | (Client ID) |
| SENT ON: | (Sender's Local Date) |
| AT: | (Sender's Local Time) |
| WAS DELIVERED/UNABLE TO BE DELIVERED WITHIN 72 HOURS AND WAS THEREFORE PURGED FROM OUR FILES; YOU WILL ONLY BE CHARGED FOR TOLLS. | |
| AT: (Time) ON: (Date) TO: (Receiving Fax ANI) | |

The components used in the present invention are standard components which are readily available. However in combination with a unique system, the present invention allows for a unique way of storing and forwarding facsimile documents via facsimile systems. The foregoing description of the specification will fully reveal the general nature of the invention that others can, by applying current knowledge, readily modify and/or adapt for various applications such specific embodiments without the departing form the generic concept, and, therefore, such adaptations and modifications should and are intended to be comprehended within the meaning and range of equivalence of the disclosed embodiment. It is to be understood that the phraseology or terminology employed herein is for the purpose of description and not of limitation.

I claim:

1. A system for receiving and transmitting confidential facsimile documents, comprising:

digital means connected to a communication line for relaying information from and to said communication line;

memory means connected to said digital means for storing a facsimile document and identifying data being associated with said facsimile document; and control means connected to said digital means and said memory means for determining whether a facsimile document is to be stored or if a facsimile document is to be forwarded, wherein when said control means determines that a facsimile document is to be stored, said control means directs said memory means to store said facsimile document only after having requested the sender to input an identification number and having received the identification number from the sender which is to be associated with said facsimile document, and when said control means determines that a previously stored facsimile document is to be forwarded, said control means directs said memory means to forward said previously stored facsimile document to a recipient only if an identification number supplied by a recipient matches the identification number created by the sender associated with said previously stored facsimile document and only if said previously stored facsimile document has not previously been forwarded to a recipient.

2. A system in accordance with claim 1, wherein said control means further includes purge means for purging each stored facsimile document which has been stored for more than a predetermined time period.

3. A system for receiving and transmitting confidential facsimile documents via communication lines systems, comprising:

digital means, connected to a communication line, for relaying information from and to said communication line;.

memory means, connected to said digital means, for storing facsimile documents and identification data which is associated with each said facsimile document;

control means, connected to said digital means and said memory means, for controlling the storing and forwarding of said facsimile documents, said control means including:

storage means for requesting the sender to input a security code number, obtaining the security code number inputted by the sender, receiving a facsimile document from the sender via said digital means and said communications line, obtaining a security delivery option for said facsimile document inputted by the sender, and directing said memory means to store said facsimile document and the associated security code number and security delivery option, and forwarding means for requesting the recipient to input a security code number, obtaining the security code number inputted by the recipient, comparing that number to the security code numbers inputted by senders and stored by said memory means in association with facsimile documents, and, only if the security code number inputted by the recipient is the same as that stored in said memory means, directing said memory means to forward the stored facsimile document associated with said security code number to the recipient via said digital means and communication line.

4. A system in accordance with claim 3, wherein said control means further includes purge means for purging each stored facsimile document which has been stored for more than a predetermined time period.

5. A system in accordance with claim 3, wherein said control means further includes security means for preventing any said stored facsimile document from being transmitted more than once.

6. A system for receiving and transmitting confidential facsimile documents via communication lines systems, comprising:

digital means, connected to a communication line, for relaying information from and to said communication line;

memory means, connected to said digital means, for storing facsimile documents and identification data which is associated with each said facsimile document;

control means, connected to said digital means and said memory means, for controlling the storing and forwarding of said facsimile documents, said control means including:

storage means for obtaining a security code number inputted by the sender, receiving a facsimile document from the sender via said digital means and said communications line, obtaining from the sender a facsimile machine telephone number of the intended recipient of the facsimile document and directing said memory means to store said facsimile document and the associated security code number and facsimile machine telephone number, and forwarding means for determining the telephone number from which the incoming call from the recipient was made, obtaining a security code number inputted by the recipient, comparing the inputted security code number to the security code numbers stored by said memory means in association with facsimile documents and facsimile machine telephone numbers, and, only if the security code number inputted by the recipient is the same as that stored in said memory means, and only if the telephone number from which said incoming call from the recipient was made is the same as the facsimile machine telephone number stored in said memory means in association with said stored facsimile document, directing said memory means to forward the stored facsimile document associated with said security code number to the recipient via said digital means and said communication line.

7. A system in accordance with claim 6, wherein said control means further includes purge means for purging each stored facsimile document which has been stored for more than a predetermined time period.

8. A system in accordance with claim 6, wherein said control means further includes security means for preventing any said stored facsimile document from being transmitted more than once.

9. A system in accordance with claim 6, wherein said forwarding means directs the stored facsimile document associated with said security code number to be forwarded to the recipient via said digital means and the communications line opened by the incoming call from the recipient.

10. A system for receiving and transmitting confidential facsimile documents via communication lines systems, comprising:

digital means, connected to a communication line, for relaying information from and to said communication line;

memory means, connected to said digital means, for storing facsimile documents and identification data which is associated with each said facsimile document; and control means, connected to said digital means and said memory means, for controlling the storing and forwarding of said facsimile documents, said control means including:

storage means for requesting the sender to input a security code number, obtaining the security code number inputted by the sender, receiving a facsimile document from the sender via said digital means and said communications line, and directing said memory means to store said facsimile document and the associated security code number without checking whether said security code number identifies a subscriber, forwarding means for requesting the recipient to input a security code number, obtaining the security code number inputted by the recipient, comparing that number to the security code numbers inputted by senders and stored by said memory means in association with facsimile documents, and, only if the security code number inputted by the recipient is the same as that stored in said memory means, directing said memory means to forward the stored facsimile document associated with said security code number to the recipient via said digital means and communication line, and security means for preventing any said stored facsimile document from being transmitted more than once.

11. A system for receiving and transmitting confidential facsimile documents, as claimed in claim 10, wherein said storage means is further for generating a message number for each said facsimile document and directing said memory means to store said message number with the associated facsimile document and security code number.

12. A system for receiving and transmitting confidential facsimile documents, as claimed in claim 11, wherein said storage means is further for communicating said message number to the sender.

13. A system for receiving and transmitting confidential facsimile documents, as claimed in claim 11, wherein said forwarding means is further for obtaining a message number inputted by the recipient in addition to the security code number, comparing that number to the message numbers stored by said memory means in association with a facsimile document, and, only if the message number and the security code number inputted by the recipient are the same as those stored in said memory means in association with a single facsimile document, directing said memory means to forward said stored facsimile document to the recipient via said digital means and said communications line.

14. A system in accordance with claim 11, wherein said control means further includes purge means for purging each stored facsimile document which has been stored for more than a predetermined time period.

15. A system in accordance with claim 11, wherein said control means further includes security means for preventing any said stored facsimile document from being transmitted more than once.

16. A system for receiving and transmitting confidential facsimile documents, as claimed in claim 10, further comprising:

voice generating means, connected to said control means, for generating voice instructions to either the sender or the recipient.

17. A system for receiving and transmitting confidential facsimile documents, as claimed in claim 10, wherein, said forwarding means is further for directing said memory means to forward the stored facsimile document only over a communications line opened by an incoming call from the recipient.

18. A system in accordance with claim 10, wherein said control means further includes purge means for purging each stored facsimile document which has been stored for more than a predetermined time period.

19. A system for receiving and transmitting confidential facsimile documents, as claimed in claim 10, wherein said storage means does not check to determine whether any number input by the sender identifies a subscriber recipient.

20. A method for storing confidential facsimile documents, comprising the steps of:

receiving a facsimile document from a sender;

requesting the sender of the facsimile document to input a security code number to be associated with the facsimile document;

storing the facsimile document and the associated security code number without checking whether said security code number identifies a subscriber; and periodically checking the date and time of receipt of each stored facsimile document and purging each stored facsimile document which has been stored for more than a predetermined time period.

21. A method for storing confidential facsimile documents as claimed in claim 20, further comprising the steps of:

requesting the sender of the facsimile document to input a facsimile machine telephone number of the intended recipient and storing the facsimile machine telephone number with the associated facsimile document and security code number.

22. A method for storing confidential facsimile documents, as claimed in claim 20, wherein there is no step of checking to determine whether any number input by the sender identifies a subscriber.

23. A method for storing confidential facsimile documents, comprising the steps of:

receiving a facsimile document from a sender;

requesting the sender of the facsimile document to create a security code number to be associated with the facsimile document and to select a security delivery option for forwarding the stored facsimile document; and storing the facsimile document and the associated security code number and security delivery option.

24. A method in accordance with claim 23, further including the step of periodically checking the date and time of receipt of each stored facsimile document and purging each stored facsimile document which has been stored for more than a predetermined time period.

25. A method for storing confidential facsimile documents, comprising the steps of:
- receiving a facsimile document from a sender;
- requesting the sender of the facsimile document to input a security code number to be associated with the facsimile document;
- creating a message number for the facsimile document received from the sender; and
- storing the facsimile document and the associated security code number and message number.

26. A method in accordance with claim 25, further including the step of periodically checking the date and time of receipt of each stored facsimile document and purging each stored facsimile document which has been stored for more than a predetermined time period.

27. A method for forwarding a confidential facsimile document which has been stored with an associated security code number created by the sender of the facsimile document, comprising the steps of:
- requesting a recipient to input a security code number;
- checking the security code number with security code numbers stored with associated facsimile documents;
- checking to determine whether the facsimile document associated with the security code has been previously forwarded to any recipient; and
- forwarding the facsimile document if the security code number matches the security code number associated therewith and if the facsimile document has not been previously forwarded to any recipient.

28. A method in accordance with claim 27, further including the step of periodically checking the date and time of receipt of each stored facsimile document and purging each stored facsimile document which has been stored for more than a predetermined time period.

29. A method for forwarding a confidential facsimile document as claimed in claim 27, wherein said forwarding step comprises:
- forwarding the facsimile document only over a communications line opened by an incoming call from the recipient.

30. A method for storing confidential facsimile documents, comprising:
- receiving facsimile documents from senders;
- requesting the sender of each facsimile document to create a security code number to be associated with that specific document and, optionally, to input other identifying information;
- optionally creating a message number for each facsimile document, whereby said security code, alone or in combination with one or more of said other identifying information and said message number, is an identifier which uniquely identifies a single associated facsimile document; and
- storing each facsimile document in conjunction with the security code and any other identifying information and any message number associated therewith.

31. A method in accordance with claim 30 and further including the step of periodically checking the date and time of receipt of each stored facsimile document and purging each stored facsimile document which has been stored for more than a predetermined time period.

32. A method in accordance with claim 30, further including the step of purging the facsimile document from storage once it has been forwarded to a recipient.

33. A method in accordance with claim 30, further including the step, prior to said snoring step, of checking the identifier of each incoming facsimile document against the identifiers of all snored facsimile documents to ensure that the incoming identifier is unique and, only if said identifier is not unique, requesting the sender to create a new security code or to input other identifying information so as to create a new identifier for the incoming facsimile document, and then repeating said checking step.

34. A method in accordance with claim 33, further including the step of purging the facsimile document from storage once it has been forwarded to a recipient.

35. A method for receiving, storing and transmitting confidential facsimile documents, comprising the steps of:
- receiving facsimile documents from senders;
- requesting the sender of each facsimile document to create a security code number to be associated with that specific document and, optionally, to input other identifying information;
- optionally creating a message number for each facsimile document, whereby said security code, alone or in combination with one or more of said other identifying information and said message number, is an identifier which uniquely identifies a single associated facsimile document;
- storing each facsimile document in conjunction with the security code and any other identifying information and any message number associated therewith;
- receiving requests for facsimile documents from recipients;
- receiving an identifier, including the security code created by the sender of that facsimile document, from a recipient for each facsimile document requested by a recipient; and
- forwarding the facsimile document which had been stored in association with said identifier only if the recipient inputs the correct identifier.

36. A method in accordance with claim 35, further including the step, prior to said forwarding step, of checking to determine whether the facsimile document associated with said identifier has been previously forwarded to any recipient, and wherein said forwarding step comprises forwarding the facsimile document which had been stored in association with said identifier only if the recipient inputs the correct identifier and only if the facsimile document has not been previously forwarded to any recipient.

37. A method in accordance with claim 36, wherein the request from the recipient is made from a communication line to which a facsimile machine is attached and the facsimile document is sent to the recipient over the open communication line initiated by the recipient.

38. A method in accordance with claim 36, further including the step of billing each sender for services with respect to each said facsimile document with no charges being made to recipients.

39. A method in accordance with claim 35, further including the step of periodically checking the date and time of receipt of each stored facsimile document and purging each stored facsimile document which has been stored for more than a predetermined time period.

40. A method in accordance with claim 35, including the step of generating a message number for each facsimile document, whereby said security code, in combination with said message number, is said identifier which uniquely identifies a single associated facsimile document, and further including the steps of:

receiving from the sender of each facsimile document the facsimile number of the intended recipient; and for each facsimile document, transmitting to the facsimile number of the intended recipient notification that a facsimile document has been stored and including the message number which had been generated with respect to said facsimile document;

wherein said forwarding step only takes place if the identifier provided by the recipient includes both the message number generated in said generating step and transmitted to the intended recipient, as well as the security code created by the sender.

41. A method in accordance with claim 40, wherein said message number is a telephone number and the recipient inputs the message number by initially dialling said telephone number.

42. A method in accordance with claim 35, further including the step of requesting the sender to input other identifying information along with said security code number, whereby said security code, in combination with said other identifying information, is said identifier which uniquely identifies a single associated facsimile document, and wherein said forwarding step only takes place if the intended recipient inputs an identifier which includes both the security code created by the sender as well as the other identifying information stored in conjunction with said facsimile document.

43. A method in accordance with claim 42, further including the step, prior to said forwarding step, of checking to determine whether the facsimile document associated with said identifier has been previously forwarded to any recipient, and wherein said forwarding step comprises forwarding the facsimile document which had been stored in association with said identifier only if the recipient inputs the correct identifier and only if the facsimile document has not been previously forwarded to any recipient.

44. A method in accordance with claim 42, wherein said other identifying information input by the sender is a telephone number of the recipient and wherein the recipient inputs said other identifying information by calling from said telephone number, the correct said other identifying information being identified by automatic number identification.

45. A method in accordance with claim 44, wherein said telephone number is a facsimile number and the facsimile is sent over the open line initiated by the recipient.

46. A method in accordance with claim 35, wherein the request from the recipient is made from a communication line to which a facsimile machine is attached and the facsimile document is sent to the recipient over the open communication line initiated by the recipient.

47. A method in accordance with claim 35, further including the step of billing each sender for services with respect to each said facsimile document with no charges being made to recipients.

48. A method in accordance with claim 47, wherein said billing step comprises billing each sender on the telephone bill of the sender for the communication line on which the original facsimile document was received from the sender.

49. A method in accordance with claim 35, further including the step of requesting the sender of each facsimile document to designate which of a plurality of optional security levels is to be used before the document may be transmitted to the recipient.

50. A method in accordance with claim 49, wherein the optional security levels which the sender is requested to designate include two or more of the following:

(a) the sender creates a security code number and the facsimile document is forwarded as long as the intended recipient knows said security code number;

(b) the sender provides other identifying information and the facsimile document is forwarded to the recipient only if the recipient inputs both the security code number and the other identifying information;

(c) a message number is generated and transmitted to the facsimile number of the recipient and the facsimile document is forwarded to the facsimile number of the recipient only if the recipient first calls from any telephone and inputs both said security code number and said message number;

(d) a message number is generated and transmitted to the facsimile number of the recipient and the facsimile document is forwarded to the recipient only if the recipient calls from a communication line attached to a facsimile machine and correctly inputs the security code number and the message number, after which the message is only forwarded to the recipient over the open communications line initiated by the recipient; and (e) the sender inputs the facsimile number of the recipient and the facsimile document is forwarded to the recipient only if the recipient calls from that facsimile machine number, as identified by automatic number identification, and correctly inputs the security code created by the sender.

* * * * *